US012177558B2

(12) United States Patent
Vasconcelos et al.

(10) Patent No.: US 12,177,558 B2
(45) Date of Patent: Dec. 24, 2024

(54) USER INTERFACE FOR ROLLING SHUTTER CAMERA ARRAYS AND ACCURATE VOLUMETRIC CAPTURE WORKFLOWS

(71) Applicant: Sony Group Corporation, Tokyo (JP)

(72) Inventors: Luis Vasconcelos, San Marcos, CA (US); Nikolaos Georgis, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 53 days.

(21) Appl. No.: 18/079,423

(22) Filed: Dec. 12, 2022

(65) Prior Publication Data

US 2024/0196084 A1   Jun. 13, 2024

(51) Int. Cl.
*H04N 23/63* (2023.01)
*G06T 7/70* (2017.01)
*G06V 10/46* (2022.01)
*H04N 13/00* (2018.01)
*H04N 13/106* (2018.01)

(52) U.S. Cl.
CPC ............. *H04N 23/635* (2023.01); *G06T 7/70* (2017.01); *G06V 10/462* (2022.01); *H04N 13/106* (2018.05); *G06T 2207/10012* (2013.01); *H04N 2013/0096* (2013.01)

(58) Field of Classification Search
CPC ............. H04N 23/635; H04N 13/106; H04N 2013/0096; H04N 23/53; H04N 23/60; H04N 23/61; H04N 23/611; H04N 23/62; H04N 23/63; H04N 23/631; H04N 23/633; H04N 23/634; H04N 23/695; H04N 23/698; G06T 7/70; G06T 2207/10012; G06V 10/462; G08B 13/19641; G08B 13/19645
USPC ........................................................ 348/159
See application file for complete search history.

(56) References Cited

U.S. PATENT DOCUMENTS 8,531,519 B1 * 9/2013 Peng ...................... H04N 7/18
                                                    382/190
10,997,697 B1   5/2021 Newman
(Continued)

OTHER PUBLICATIONS https://www.ioindustries.com/volumetric-capture; Volumetric Capture; 7 pages.
(Continued)

*Primary Examiner* — Albert H Cutler
(74) *Attorney, Agent, or Firm* — Trellis IP Law Group, PC

(57) ABSTRACT

An apparatus includes one or more processors and logic encoded in one or more non-transitory media for execution by the one or more processors and when executed operable to receive a first image of an object, wherein the first image was captured by a first camera in a set of cameras. The logic is further operable to determine first keypoints and a first pose for the object based on the first image. The logic is further operable to receive a second image from a second camera in the set of cameras. The logic is further operable to determine an overlap of the first image and the second image based on locations of the first keypoints, the second keypoints, the first pose, and the second pose. The logic is further operable to determine a synchronization error between the first image and the second image based on the overlap.

20 Claims, 17 Drawing Sheets

(56) References Cited

U.S. PATENT DOCUMENTS

| | | | | |
|---|---|---|---|---|
| 2011/0242356 A1* | 10/2011 | Aleksic | ............... | H04N 13/161 |
| | | | | 348/222.1 |
| 2018/0101964 A1* | 4/2018 | Lee | ........................... | G06T 7/70 |
| 2019/0005678 A1* | 1/2019 | Lindner | .................... | G06T 7/74 |
| 2020/0242805 A1* | 7/2020 | Deng | ....................... | G06T 7/292 |
| 2022/0198697 A1* | 6/2022 | Gomita | .................... | G06T 7/97 |
| 2024/0112469 A1* | 4/2024 | Mitra | ................... | G06V 10/759 |

OTHER PUBLICATIONS

3D Reconstruction—Duke University; The Essential Matrix the Structure of E: Rank and Null Space X a X b Y a Y b Z a Z b a b e R, t E has rank 2 and null(E) = span(t) = span(e)Geometry: The epipole e is in the epipolar line bT Ex = 0 for every b Therefore, bT Ee = 0 for all b Therefore Ee = 0, so e 2null(E) Algebra:courses. cs.duke.edu.

* cited by examiner

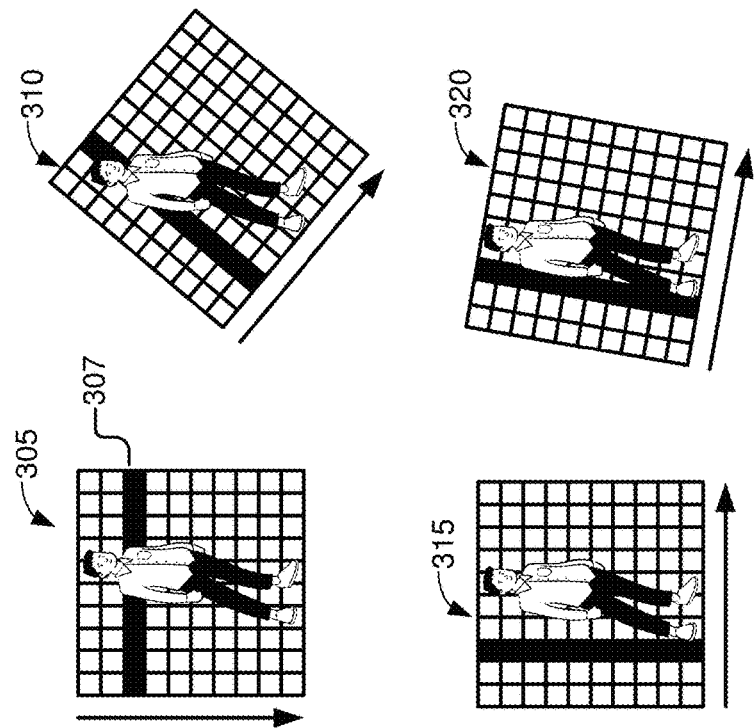
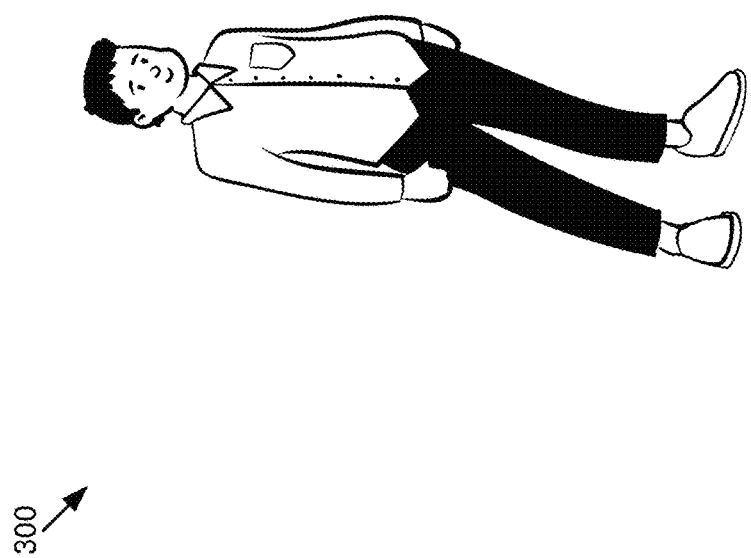
FIG 3

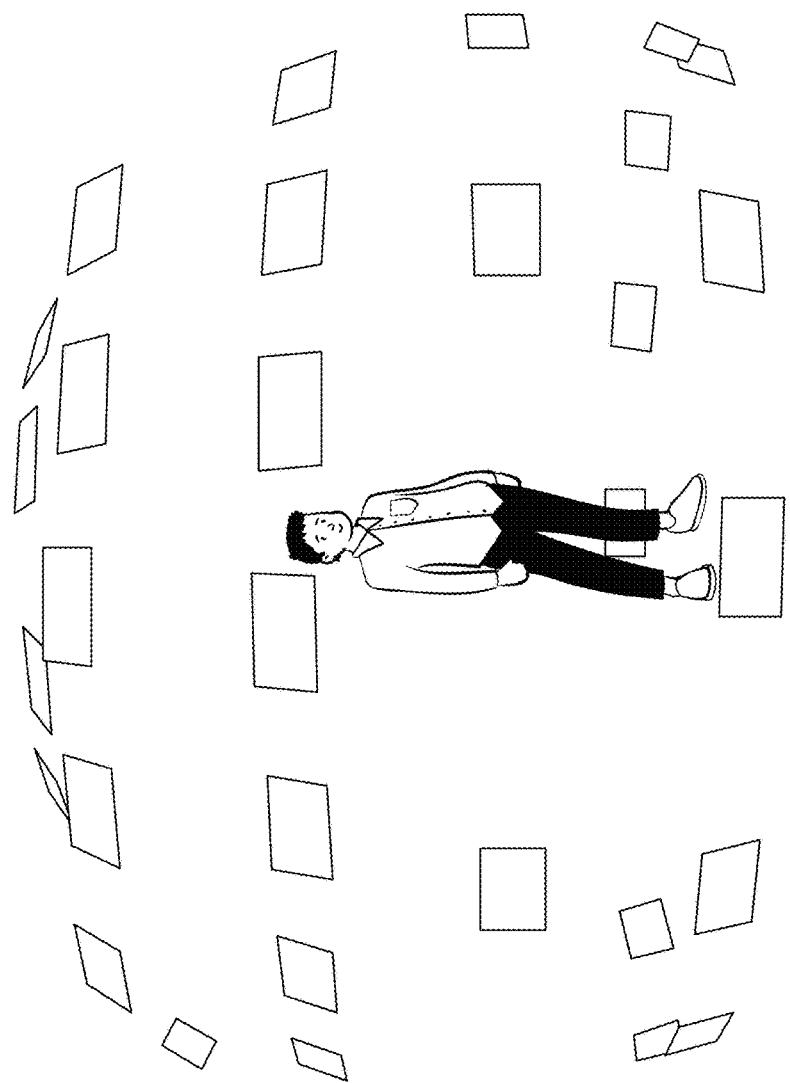

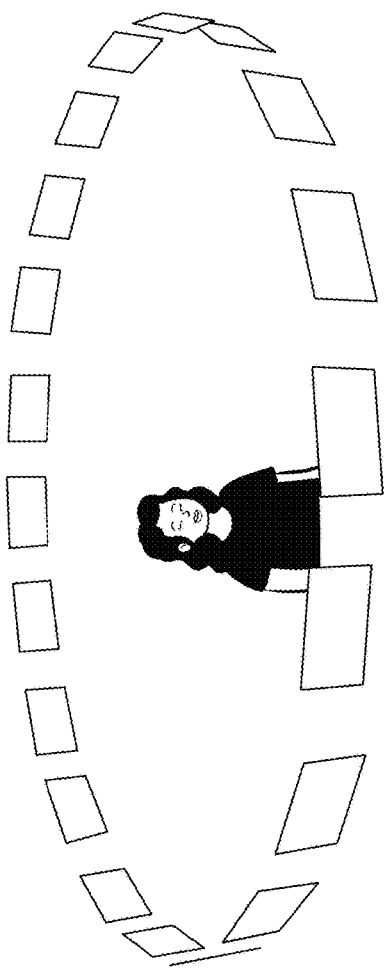

USER INTERFACE FOR ROLLING SHUTTER CAMERA ARRAYS AND ACCURATE VOLUMETRIC CAPTURE WORKFLOWS

BACKGROUND

Cameras may capture images using a global shutter or a rolling shutter. A global shutter in a camera captures an entire image of a scene at the same time. However, the hardware for capturing images with a global shutter is too expensive to use in conventional cameras. Instead, cameras that capture images with rolling shutter are more economically feasible.

A rolling shutter captures images by scanning lines across an image of a scene vertically or horizontally. As a result, 10-33 milliseconds may pass between the beginning of capture of the image to the end of capture of the image. This is not an issue when the scene includes static objects, but a problem arises when the scene includes an object in motion because different portions of the image will be captured at different times and a position of the moving object may have changed in the interim.

As a result, the position of each camera in a set of cameras that are being used to capture an object in motion is important and differences between the positions of the cameras result in synchronization errors.

SUMMARY

A computer-implemented method includes receiving a first image of an object, wherein the first image was captured by a first camera in a set of cameras. The method further includes determining first keypoints and a first pose for the object based on the first image. The method further includes receiving a second image from a second camera in the set of cameras, wherein the second image is associated with second keypoints and a second pose of the object. The method further includes determining an overlap of the first image and the second image based on locations of the first keypoints, the second keypoints, the first pose, and the second pose. The method further includes determining a synchronization error between the first image and the second image based on the overlap. The method further includes generating graphical data that displays a user interface with instructions for changing a position of the second camera based on the synchronization error.

In some embodiments, the method further includes performing object recognition of the object in the first image to identify a type of object in the first image, wherein determining the first keypoints and the first pose for the object is based on the type of object in the image. In some embodiments, the method further includes determining whether the synchronization error exceeds a threshold error and responsive to the synchronization error exceeding the threshold error, transmitting the graphical data that displays the user interface to the second camera. In some embodiments, the first camera is a master camera and the method further includes determining whether the synchronization error exceeds a threshold error and responsive to the synchronization error exceeding the threshold error, transmitting the graphical data that displays the user interface to the second camera. In some embodiments, determining the first keypoints and the first pose for the object is based on a machine-learning model that is trained to identify a type of object, the first keypoints, and the first pose, based on supervised learning. In some embodiments, a training data set that is used to train the machine-learning model includes labeled keypoints that identify different parts of a body for the type of object. In some embodiments, the instructions for changing the position of the second camera includes a graphic that indicates a direction selected from the group consisting of moving up, moving down, moving left, moving right, tilting, rotating, and combinations thereof. In some embodiments, generating the graphical data that displays the user interface with instructions for changing a position of the camera includes a model of the one or more objects and an overlay of the one or more objects that represent a current position of the camera, wherein moving the position of the camera causes the overlay to be displayed closer or farther away to the model of the one or more objects. In some embodiments, determining the synchronization error is based on using epipolar geometry to determine a difference between the first image and the second image and wherein the first keypoints and the second keypoints are facial keypoints.

An apparatus includes one or more processors and logic encoded in one or more non-transitory media for execution by the one or more processors and when executed are operable to: receive a first image of an object, wherein the first image was captured by a first camera in a set of cameras, determine first keypoints and a first pose for the object based on the first image, receive a second image from a second camera in the set of cameras, wherein the second image is associated with second keypoints and a second pose of the object, determine an overlap of the first image and the second image based on locations of the first keypoints, the second keypoints, the first pose, and the second pose, determine a synchronization error between the first image and the second image based on the overlap, and generate instructions for automatically changing a position of the second camera based on the synchronization error.

In some embodiments, the logic is further operable to perform object recognition of the object in the first image to identify a type of object in the first image, wherein determining the first keypoints and the first pose for the object is based on the type of object in the image. In some embodiments, the logic is further operable to determine whether the synchronization error exceeds a threshold error and responsive to the synchronization error exceeding the threshold error, transmit the instructions to the second camera. In some embodiments, determining the first keypoints and the first pose for the object is based on a machine-learning model that is trained to identify a type of object, the first keypoints, and the first pose, based on supervised learning. In some embodiments, a training data set that is used to train the machine-learning model includes labeled keypoints that identify different parts of a body for the type of object.

Software encoded in one or more computer-readable media for execution by the one or more processors and when executed is operable to: receive a first image of an object, wherein the first image was captured by a first camera in a set of cameras, determine first keypoints and a first pose for the object based on the first image, receive a second image from a second camera in the set of cameras, wherein the second image is associated with second keypoints and a second pose of the object, determine an overlap of the first image and the second image based on locations of the first keypoints, the second keypoints, the first pose, and the second pose, determine a synchronization error between the first image and the second image based on the overlap, and graphical data that displays a user interface with instructions for changing a position of the second camera based on the synchronization error.

In some embodiments, the one or more processors are further operable to perform object recognition of the object in the first image to identify a type of object in the first image, wherein determining the first keypoints and the first pose for the object is based on the type of object in the image. In some embodiments, the one or more processors are further operable to determine whether the synchronization error exceeds a threshold error and responsive to the synchronization error exceeding the threshold error, transmit the graphical data that displays the user interface to the second camera from the set of cameras. In some embodiments, determining the first keypoints and the first pose for the object is based on a machine-learning model that is trained to identify a type of object, the first keypoints, and the first pose, based on supervised learning. In some embodiments, the instructions for changing the position of the second camera includes a graphic that indicates a direction selected from the group consisting of moving up, moving down, moving left, moving right, tilting, rotating, and combinations thereof. In some embodiments, generating the graphical data that displays the user interface with instructions for changing a position of the camera includes a model of the one or more objects and an overlay of the one or more objects that represent a current position of the camera, wherein moving the position of the camera causes the overlay to be displayed closer or farther away to the model of the one or more objects.

A further understanding of the nature and the advantages of particular embodiments disclosed herein may be realized by reference of the remaining portions of the specification and the attached drawings.

BRIEF DESCRIPTION OF THE DRAWINGS

FIG. 3 is an illustration of how rolling shutter works when the camera is at different angles according to some embodiments described herein.

FIG. 6 is an example a set of cameras that capture images of an object where the cameras are positioned in a landscape orientation according to some embodiments described herein.

FIG. 7 is an example of a set of cameras that are positioned in a second layer in a landscape orientation according to some embodiments described herein.

DETAILED DESCRIPTION OF EMBODIMENTS

Example Environment 100

Figure 1:
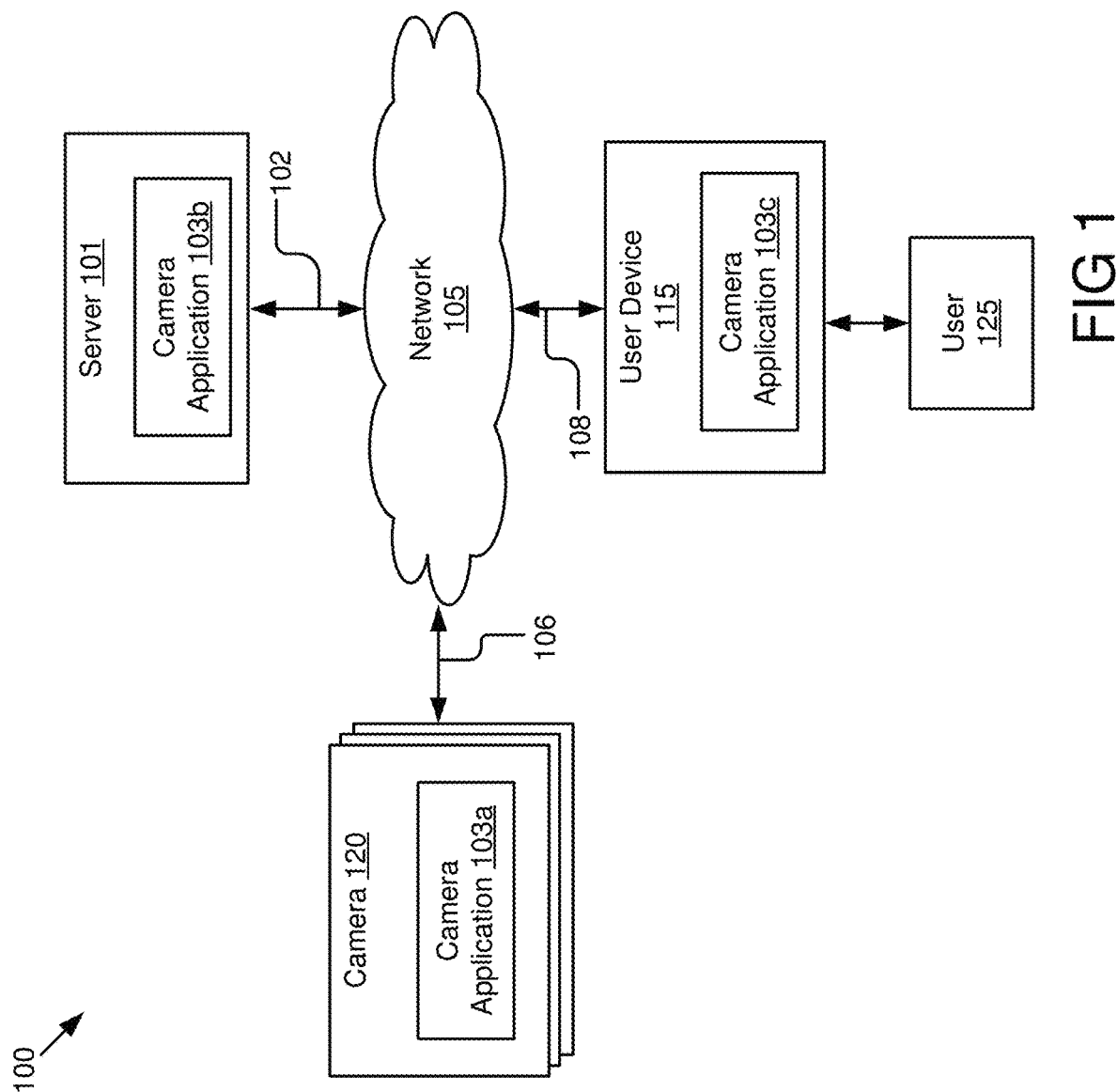
FIG. 1 is a block diagram of an example network environment according to some embodiments described herein.

FIG. 1 illustrates a block diagram of an example environment 100. In some embodiments, the environment 100 includes cameras 120, a server 101, and a user device 115. A user 125 may be associated with the user device 115. In some embodiments, the environment 100 may include other servers or devices not shown in FIG. 1. In FIG. 1 and the remaining figures, a letter after a reference number, e.g., "120a," represents a reference to the element having that particular reference number (e.g., specific cameras). A reference number in the text without a following letter, e.g., "120," represents a general reference to embodiments of the element bearing that reference number (e.g., any camera).

The camera 120 may include a processor, a memory, a camera application 103a, a display, any type of image capture device that can capture images and/or video, and network communication hardware. The camera 120 is communicatively coupled to the network 105 via signal line 106.

The camera 120 includes an optical sensor, which is also known as an image sensor. The optical sensor converts light waves into signals. The global shutter reads the data from the optical sensor by reading the optical sensor line by line. The camera 120 may include additional sensors, such as a gyroscope, for identifying a position and an orientation of the camera 120. When the camera 120 captures an image, the camera 120 generates metadata that includes the position and orientation of the camera 120. The camera 120 transmits the images and the metadata to the camera application 103. In some embodiments, the camera 120 transmits a location and position of the camera 120 to the camera application 103 that is independent of the images.

In some embodiments, the cameras 120 are organized around an object. For example, the cameras 120 may be organized in multiple horizontal layers with the cameras 120 positioned in a landscape orientation or in multiple vertical layers with the cameras 120 positioned in a portrait orientation.

In some embodiments, the camera 120 is part of a drone. For example, the set of cameras 120 may be in a set of drones that are used to capture images of one or more objects, such as people playing a game, people in a performance, a building, etc.

In some embodiments, one of the cameras 120 may be designated as a master camera. The master camera 120a instructs the other cameras 120 in a set of cameras 120 to make modifications. For example, the master camera 120a may capture an initial image of an object, receive subsequent images from other cameras 120, and generate instructions for the other cameras 120 to change their positions to reduce a synchronization error. In some embodiments, the master camera 120a is designated as the master camera 120a based on being the first camera 120a in a set of cameras 120 to be initialized. In some embodiments, the master camera 120a is designated as the master camera 120a based on a designation by an administrator. For example, the administrator may select a unique identifier associated with a particular camera 120a as the master camera 120a.

In some embodiments, the camera application 103a includes code and routines operable to receive a first image of an object from a first camera 120a in a set of cameras 120, determine first keypoints and a first pose for the object based on the first image; receive a second image from a second camera 120a in the set of cameras 120, where the second image is associated with second keypoints and a second pose of the object; determine an overlap of the first image and the second image based on locations of the first keypoints, the second keypoints, the first pose, and the second pose; determine a synchronization error between the first image and the second image based on the overlap; and generate graphical data that displays a user interface with instructions for changing a position of the second camera based on the synchronization error.

In some embodiments where the camera 120 is part of a drone, the drone may receive instructions from the server 101 and/or the user device 115 for changing orientation and/or position for capturing all aspects of the object. The drone may automatically adjust based on the instructions.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server 101 sends and receives data to and from one or more of the cameras 120 and the user device 115 via the network 105. The server 101 may include a camera application 103b.

In some embodiments, the camera application 103b includes code and routines operable to receive a position and orientation of each camera 120 and determine whether the cameras 120 are all at the same orientation. For example, the camera application 103b determines whether each camera is in a portrait orientation or a landscape orientation.

In some embodiments, the camera application 103b receives a position of each of the cameras 120, such as an angle as compared to a reference, such as the ground. The camera application 103b may determine whether any of the cameras need to be adjusted and send instructions to the camera 120 to display a user interface with instructions to adjust the camera 120 or to automatically adjust the camera 120. For example, the camera application 103b may generate a user interface that includes an illustration for rotating the camera 120, for changing the camera 120 from a landscape orientation to a portrait orientation, for changing a location of the camera 120 by moving it six inches, etc.

The camera application 103b may include code and routines operable to receive images from a set of cameras. For each level of cameras, the camera application 103b performs feature extraction on a subset of the images corresponding to the level to identify features of the object, matches extracted features between the subset of the images, and generates a three-dimensional (3D) pointcloud based on the position and orientation of the corresponding cameras 120. In some embodiments, the camera application 103b uses the keypoints of the object that were determined during calibration to generate the 3D pointcloud. The camera application 103b merges the 3D pointcloud for each level of the cameras to form a 3D volumetric model of the object.

The user device 115 may be a computing device that includes a memory, a hardware processor, and a camera application 103c. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the cameras 120.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, the camera application 103c stored on the user device 115 performs the steps mentioned above with reference to the camera application 103b stored on the server 101. In some embodiments, the camera application 103b receives instructions from the camera application 103b to generate a user interface that provides the user 125 with instructions on how to reposition one or more of the cameras 120.

Example Computing Device 200

Figure 2:
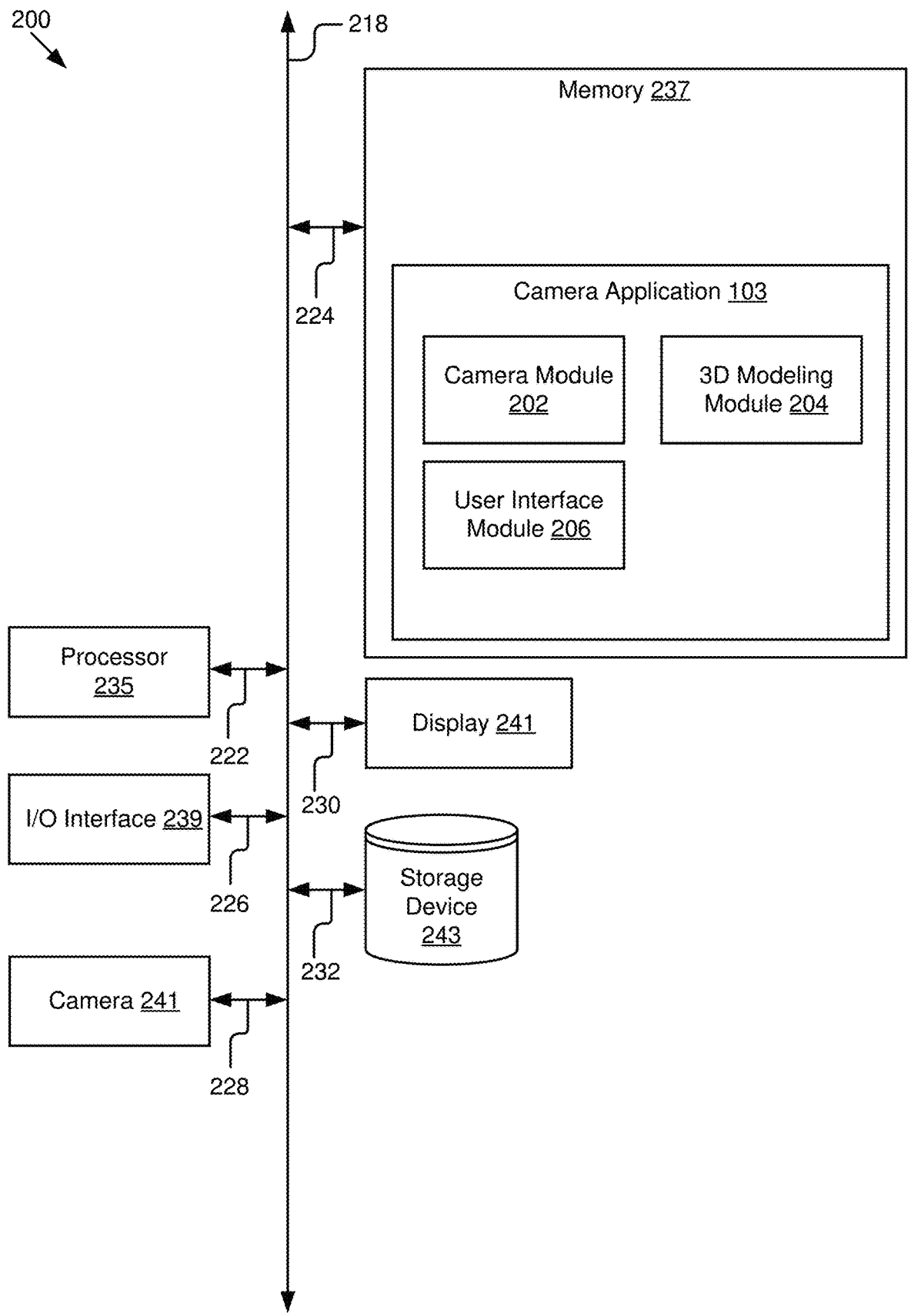
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 is the camera 120 illustrated in FIG. 1. In another example, the computing device 200 is the server 101 illustrated in FIG. 1. In yet another example, the computing device 200 is the user device 115 illustrated in FIG. 1.

In some embodiments, computing device 200 includes a processor 235, a memory 237, an Input/Output (I/O) interface 239, a camera 241, a display 243, and a storage device 245. The processor 235 may be coupled to a bus 218 via signal line 222, the memory 237 may be coupled to the bus 218 via signal line 224, the I/O interface 239 may be coupled to the bus 218 via signal line 226, the camera 241 may be coupled to the bus 218 via signal line 228, the display 243 may be coupled to the bus 218 via signal line 230, and the storage device 245 may be coupled to the bus 218 via signal line 232.

The processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the camera application 103.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 245), and input/output devices can communicate via I/O interface 239. In some embodiments, the I/O interface 239 can connect to interface devices such as input devices (keyboard, pointing device, touchscreen, microphone, sensors, etc.) and/or output devices (display devices, speaker devices, etc.).

Some examples of interfaced devices that can connect to I/O interface 239 can include a display 341 that can be used to display content, e.g., a graphical user interface (GUI), and to receive touch (or gesture) input from a user. Display 243 can include any suitable display device such as a liquid crystal display (LCD), light emitting diode (LED), or plasma display screen, cathode ray tube (CRT), television, monitor, touchscreen, 3D display screen, or other visual display device.

The camera 243 may be any type of image capture device that can capture images and/or video. In some embodiments, the camera 243 captures images or video that the I/O interface 239 transmits to the camera application 103.

The storage device 245 stores data related to the camera application 103. For example, the storage device 245 may store data about each of the cameras 120 including the position and orientation information, images from each of the cameras, 3D volumetric models of objects, etc.

Although particular components of the computing device 200 are illustrated, other components may be added. For example, where the computing device 200 is part of the camera 120, the camera 120 may include hardware for automatically adjusting the camera 120, such as a servo and mount.

Example Camera Application 103

In some embodiments, the camera application 103 includes a camera module 202, a 3D modeling module 204, and a user interface module 206.

The camera module 202 processes data about the cameras 120. In some embodiments, the camera module 202 includes a set of instructions executable by the processor 235 to process the data about the cameras 120. In some embodiments, the camera module 202 is stored in the memory 237 of the computing device 200 and can be accessible and executable by the processor 235.

In some embodiments, the camera module 202 receives data about each of the cameras 120 in a set of cameras 120. The camera module 202 may receive the data as part of a setup process before images are transmitted or as part of metadata associated with images. If the data is received as metadata, the camera module 202 extracts the camera data from the metadata.

The camera module 202 determines one or more of a position, an angle, or an orientation of the cameras 120. The position refers to the location of the camera. The angle refers to direction of view and rotation of the camera 120. For example, the angle may include Euler angles called omega, phi, and kappa, which define the rotation of the camera from a default position. The orientation of the camera 120 may include a landscape orientation or a portrait orientation. The landscape orientation is also known as the horizontal orientation in which the long sides of the rectangle are at the top and the bottom. The portrait orientation is also known as the vertical orientation in which the short sides of the rectangle are at the top and the bottom.

Capturing images from cameras 120 that use rolling shutters results in artifacts in 3D models of the objects if the cameras 120 are not properly configured. The artifacts may include blurring or straight lines may appear curved and bent. Turning to FIG. 3, a block diagram 300 illustrates a rolling shutter when the camera 120 is at different angles. FIG. 3 includes four examples of rolling shutters.

The first example 305 includes a line 307 that represents the process of the rolling shutter as the rolling shutter moves from top to bottom while the camera 120 is in a portrait orientation. Different portions of the image are captured at different times. This can result in artifacts, especially when an object being captured by the image is in motion. In this first example 305, the image does not include artifacts because the lines capture symmetrical portions of the body at a substantially similar time. Specifically, the arms are captured at a substantially similar time so that any movement that occurs during the capture of the image will be reflected on both sides of the body.

The second example 310 represents the process of the rolling shutter as the rolling shutter moves from left to right while the camera 120 is in a landscape orientation and at an angle. As with the first example 305, the second example 310 does not result in artifacts because the portions of the boy are captured at a substantially similar time. For example, the shoulders are captured at a substantially similar time.

The third example 315 represents the process of the rolling shutter as the rolling shutter moves from left to right and the camera 120 is in a landscape orientation. The third example 315 may result in artifacts because, for example, the boy's right foot is captured before the boy's left foot and the left foot may move in the interim.

The fourth example 320 represents the process of the rolling shutter as the rolling shutter moves from left to right and the camera 120 is in a landscape orientation and at an angle. The fourth example 320 may result in artifacts because, for example, the boy's position may move while the image is being captured.

Figure 4:
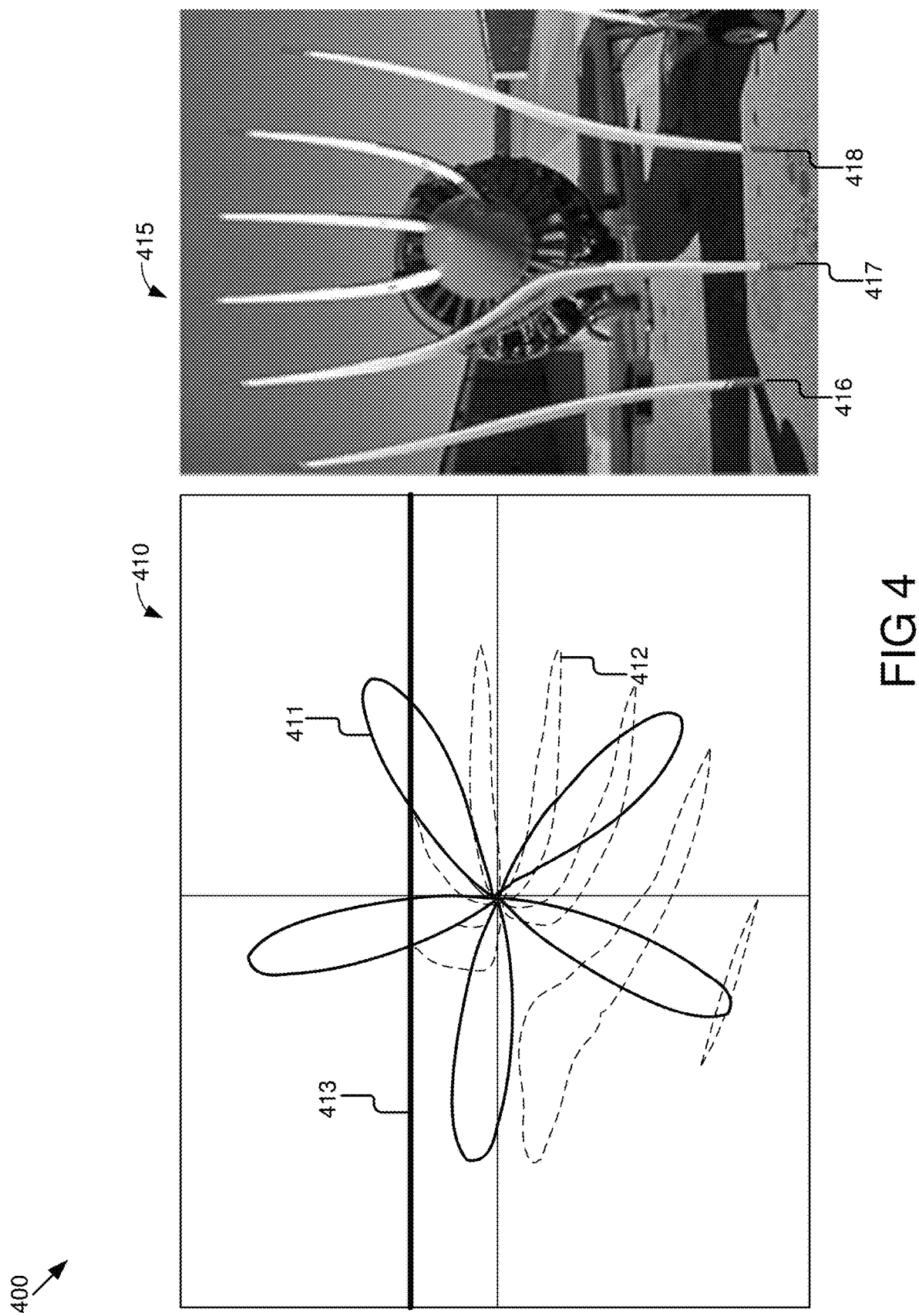
FIG. 4 is an illustration of how rolling shutter on a camera results in artifacts in an image according to some embodiments described herein.

FIG. 4 is an illustration 400 of how rolling shutter on a camera results in artifacts in an image according to some embodiments described herein. In the first box 410, the solid curved lines 411 represent the wings of an airplane propeller, the dashed lines 412 represent the motion captured during the rolling shutter, and the solid bolded horizontal line 413 represents the position of the rolling shutter.

The second box 415 includes the resulting image of the airplane propeller captured by the rolling shutter. The second box 415 illustrates several artifacts 416, 417, 418 where the wings are not attached to the propeller.

The issue of synchronization becomes even more pronounced when there are multiple cameras capturing images of an object. For example, 70-100 cameras may be used to generate a 3D volumetric model and if some of the cameras are misaligned, the artifacts are particularly pronounced. In some embodiments, the camera module 202 solves this issue by ensuring that the cameras 120 all have a colinear orientation. In some embodiments, the camera module 202 further ensures that the cameras 120 have positions, angles, and orientations that are aligned for all cameras 120 in a set of cameras 120. As a result of ensuring alignment of the cameras 120, the cameras 120 scan the same line number at the same time, thereby reducing artifacts in the 3D volumetric model.

In some embodiments, the camera module 202 determines whether each of the cameras 120 in the set of cameras 120 captures images that are colinear. For example, the camera module 202 may determine whether a camera 120 has one or more of a correct position, angle, or orientation as compared to the other cameras 120. In some embodiments, the camera module 202 determines that the orientation is the same for each of the cameras 120. For example, the camera module 202 determines that all the cameras 120 are using a landscape orientation or a portrait orientation. In some embodiments, the camera module 202 also determines that the position and/or angle of the cameras 120 are correct. If one or more cameras 120 need a correction of the position, angle, or orientation, in some embodiments, the camera module 202 instructs the user interface module 206 to generate a user interface that instructs a user 125 on how to correct the camera 120.

Figure 5:
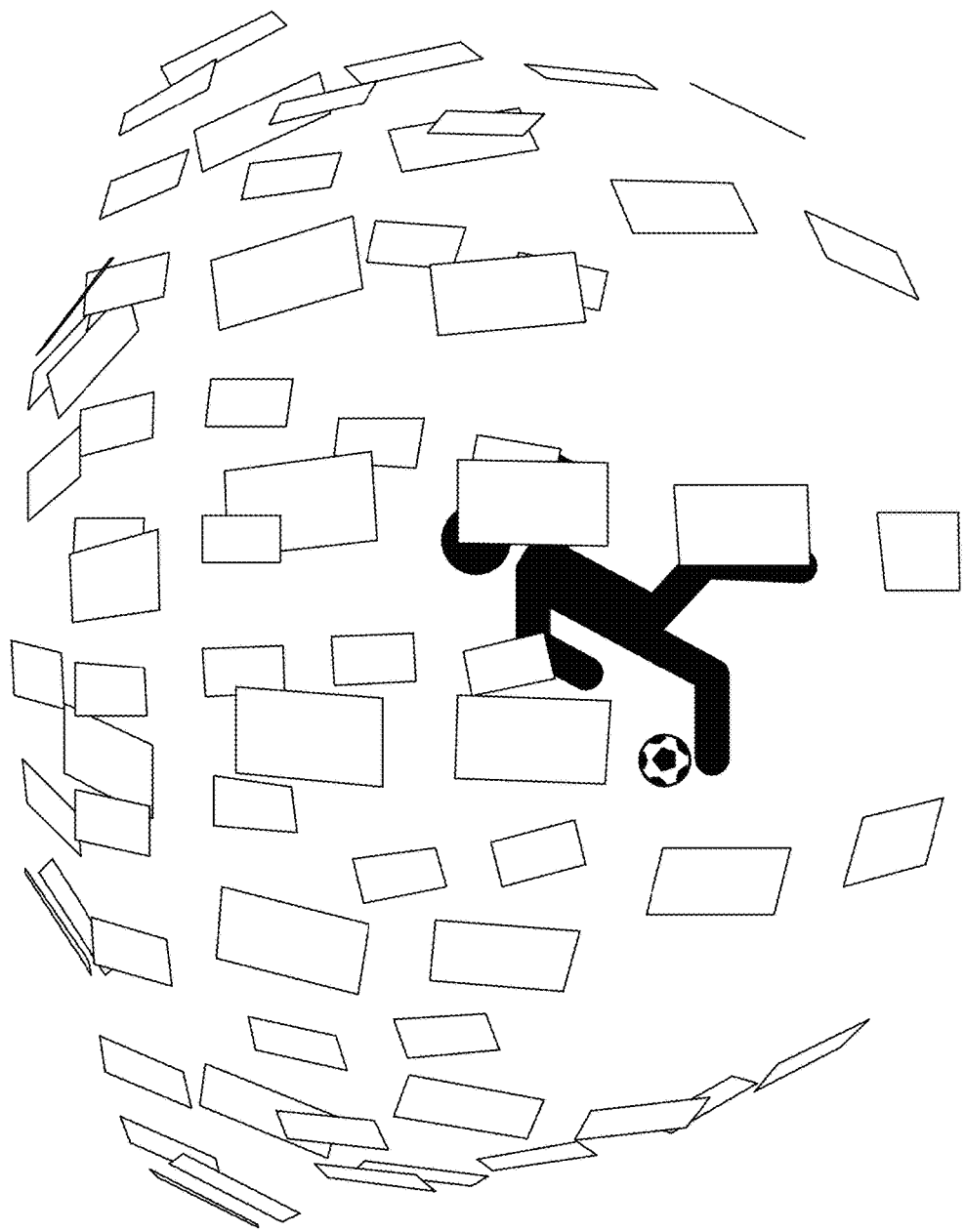
FIG. 5 is an example of a set of cameras that capture images of objects where the cameras are positioned in a portrait orientation according to some embodiments described herein.

Turning to FIG. 5, is an illustration 500 of a set of cameras 120 that capture images of objects where the cameras are positioned in a portrait orientation. The objects are a person kicking a soccer ball. Because the person is in motion, the set of cameras 120 are arranged in the same portrait orientation in order to capture the images.

FIG. 6 is an illustration 600 of a set of cameras 120 that capture images of an object where the cameras are positioned in a landscape orientation. This configuration is referred to as a landscape cylinder. The cameras 120 may be arranged in different levels where the images from each level are processed independently to maintain synchronization.

FIG. 7 is an illustration 700 of a set of cameras 120 that are positioned in a second layer in a landscape orientation. The person is illustrated as only having half of a body because the illustrated part of the person corresponds to the area being captured by the cameras arranged at the L2 level.

The 3D modeling module 204 determines keypoints and poses for objects and generates a 3D model of the object. In some embodiments, the 3D modeling module 204 includes a set of instructions executable by the processor 235 to determine the keypoints and the poses for objects and generate the 3D models. In some embodiments, the 3D modeling module 204 is stored in the memory 237 of the computing device 200 and can be accessible and executable by the processor 235.

In some embodiments, the 3D modeling module 204 receives a first image of an object. For example, where the camera application 103a is stored on a master camera 120a, the 3D modeling module 204 receives the first image from the camera 241. In another example where the camera application 103b is stored on the server 101, the camera application 103b receives the first image from a first camera 120a in a set of cameras 120. The first image includes one or more objects. While the description below describes the process for one object for simplicity, the process may apply to multiple objects, where the objects may be the same type (e.g., two humans) or different types (e.g., a human and a cat).

In some embodiments, the 3D modeling module 204 performs object recognition based on the first image. For example, the 3D modeling module 204 may identify that the object is a human, a dog, etc. In some embodiments, the 3D modeling module 204 is more specific and identifies that the object is a woman, a boy, a chihuahua, etc. In some embodiments, the 3D modeling module 204 uses a machine-learning model that is trained to receive an image that includes an object as input and output a type of object in the image. In some embodiments, the type of object is also associated with a confidence level. For example, an object may be identified as 95% confidence level of a bird and 10% confidence level of being a monkey.

The 3D modeling module 204 determines keypoints for the object based on the initial image. In some embodiments, the 3D modeling module 204 determines the keypoints for the object based on the type of object. For example, a human will have different keypoints than a cat. In some embodiments, 3D modeling module 204 determines the keypoints using an algorithm. For example, Features from Accelerated Segments Test (FAST) calculates keypoints by considering pixel brightness around a given area. In another example, Speeded-up Robust Features (SURF) uses a blob detector based on a Hessian matrix to find points of interest, where a determinant of the Hessian matrix is used as a measure of local change around the point and points are chosen where this determinant is maximal.

In yet another example, Scale Invariant Feature Transform (SIFT) determines a difference of Gaussians space generation, keypoints detection, and feature description. The SIFT algorithm identifies keypoints in a first image that are compared to keypoints in a second image irrespective of rotation, translation, and scale. In some embodiments, the SIFT algorithm computes scale-space maxima of a Laplacian representation using differences of Gaussians where the maxima correspond to the keypoints. In some embodiments, the 3D modeling module applies a filter to reduce the number of keypoints in an image to reduce the computational demand during feature extraction.

Figure 8A:
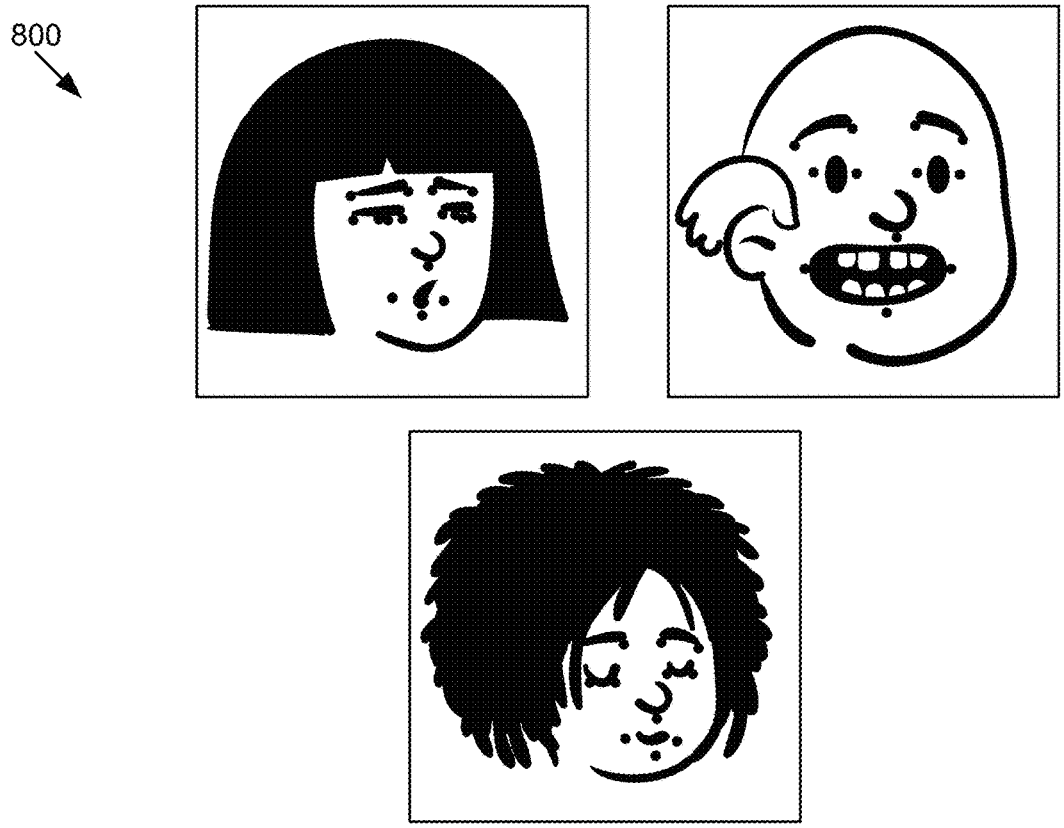
FIG. 8A includes examples of people with facial keypoints overlaid on the faces according to some embodiments described herein.

Turning to FIG. 8A, examples 800 of people with facial keypoints overlaid on the faces are illustrated. In these examples, the 3D modeling module 204 determines keypoints for the face that are identifying aspects of the face. For example, the keypoints include the edges of the eyebrows, keypoints along the eyes, a keypoint directly below the center of the nose, keypoints on each side of the lips, and a keypoint directly below the center of the lips. In this example, the initial image may be captured by a camera 12—that is at the top row of several rows of cameras 120 that only captures the top of an object. Other initial images are possible, such as an initial image that includes the top half of a person, an entire image of two people, etc.

Figure 8B:
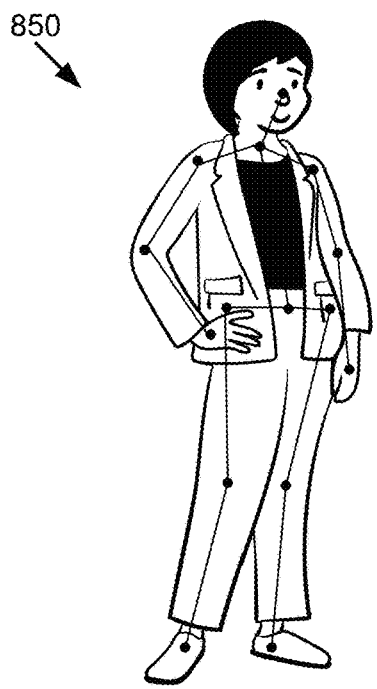
FIG. 8B is an example of a human pose overlaid on the human object according to some embodiments described herein.

The 3D modeling module 204 determines a pose of the object in the first image. The pose is a set of coordinates for each joint in an object. For example, FIG. 8B is an example 850 of a human pose overlaid on the human object. The pose includes joints for a head, a base of the neck, the shoulders, the elbows, the wrists, the pelvis, the knees, and the ankles. The 3D modeling module 204 determines a pose that forms a skeleton-like representation of the object, which is used for further processing.

In some embodiments, the 3D modeling module 204 includes a machine-learning model that is trained to output the first keypoints and the first pose. In some embodiments, the machine-learning model is the same machine-learning model or a different one than the machine-learning model mentioned above that identifies a type of object in the first image. For example, the machine-learning model may identify a type of object in the first image, compare the first image of the object to first keypoints for the type of object, compare the first image of the object to first poses for the type of object, and output the first keypoints and the first pose for the first image.

The machine-learning model may be trained using a supervised learning process by training the machine-learning model with a data set that includes labelled types of objects that are used to train the machine-learning model to output types of objects. The data set may further include labelled keypoints based on types of objects and parts of a body. For example, the labels may include facial keypoints for a human. The data set may further include labelled poses for a type of object. For example, the poses may include labels for elbow joint for a monkey, neck joint for a bird, etc.

In some embodiments, the machine-learning model may include a classical approach to pose estimation that uses a discriminator that models the likelihood of a certain part present at a particular location and a prior location that models the probability distribution over pose using the output from the discriminator. In some embodiments, the machine-learning model may employ a feature building method, such as a histogram-oriented Gaussian, contours, histograms, etc. In some embodiments, the machine-learning model may include a deep-learning approach, such as a convolutional neural network that extracts patterns and representations from an input image with layers that are increasingly abstracted. Another deep-learning approach may include a deep neural network that detects body parts or key points in an input image and maps the key points to form pairs. In some embodiments, different types of machine-learning models are used depending on the input image. For example, the deep-neural network may be best suited for an input image with a single object.

The 3D modeling module 204 receives a second image from a second camera 120b. In some embodiments, the 3D modeling module 204 receives second keypoints and a second pose of the object from the second camera 120b where the second camera 120b determined the second keypoints and the second pose. In some embodiments, the 3D modeling module 204 receives the second image and determines the second keypoints and the second pose of the object using the techniques described above.

In some embodiments, the 3D modeling module 204 determines an overlap of the first image and the second image based on locations of the first keypoints, the second keypoints, the first pose, and the second pose. For example, the 3D modeling module 204 may use the location of the first keypoints and the first pose to determine an overlap of the second image based on the second keypoints and the second pose where the location is identified based on x, y coordinates of the keypoints within the image. If the second camera 120b is at a position that is too different from the first camera 120a, the 3D modeling module 204 may not be able to generate a 3D model of the object. In some embodiments, the 3D modeling module 204 determines the overlap where there is a 10-20 degree or less difference between the cameras. If the difference between the cameras is greater than 20 degrees, there may be insufficient overlap of the images to determine a synchronization error.

In instances where a master camera 120a is used, the first image may be used as a reference for all other images such that the positions of the other cameras 120 are modified to be aligned with the master camera 120a.

Figure 9:
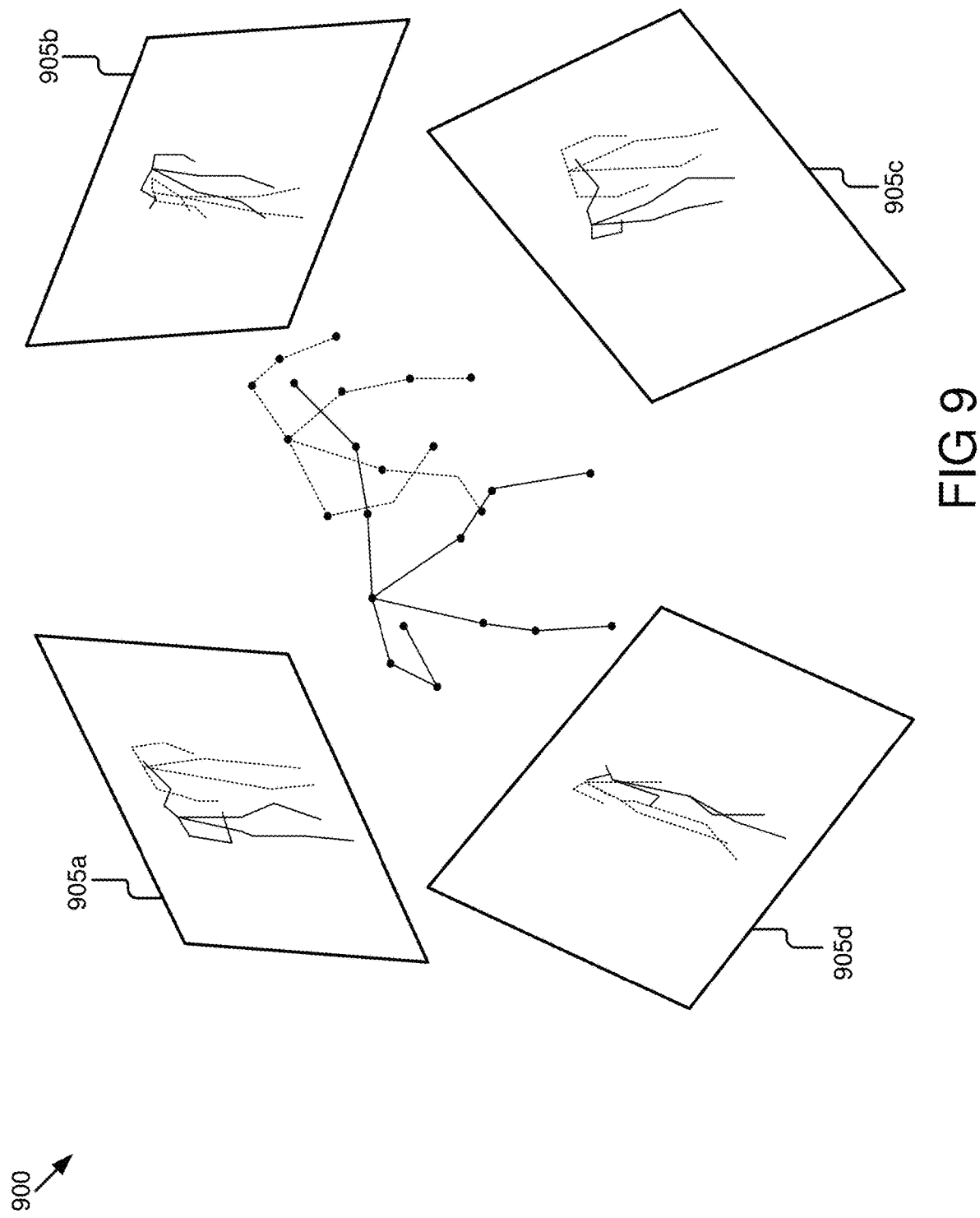
FIG. 9 is a block diagram that illustrates how the pose of two objects is different depending on the angle of the camera that captures an image according to embodiments described herein.

FIG. 9 is a block diagram 900 that illustrates how the pose of two objects is different depending on the angle of the camera that captures an image. The images 905a, b, c, d are taken at different positions, which results in the poses of the figures being captured at different angles. The 3D modeling module 204 determines the overlap of the different images 905a, b, c, d based on the overlap between the different poses. The synchronization error of the images 905a, b, c, d is reduced when the cameras are positioned similarly such that the lines of the rolling shutter are synchronized to be captured at a substantially similar time.

The 3D modeling module 204 determines a synchronization error between the first image and the second image based on the overlap. In some embodiments, the 3D modeling module 204 uses epipolar geometry to determine the synchronization error. More specifically, epipolar geometry refers to the geometric relationship between 3D points and their projections onto the 2D images that lead to constraints between the image points. The 3D modeling module 204 may use epipolar geometry to determine a point in 3D space as represented by a point in the first pose and a difference between the point in the first pose and the point in the second pose.

Figure 10A:
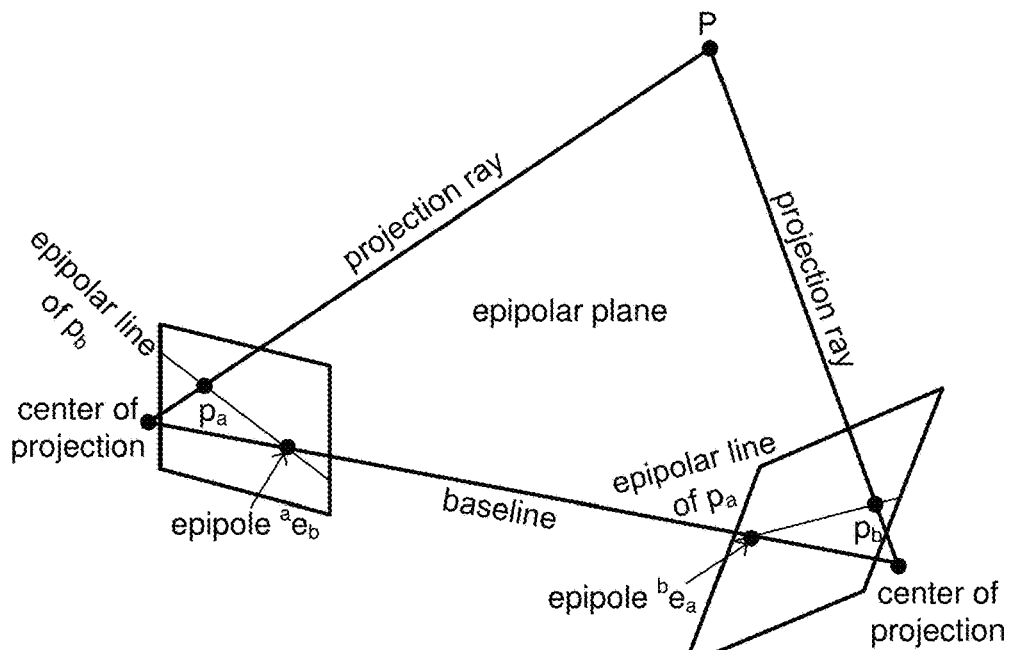
FIG. 10A illustrates how a triangle represents the relationship between the view of two cameras to an object according to some embodiments described herein.

FIG. 10A illustrates how a triangle 1000 represents the relationship between the view of two cameras to a point in an object. The point $p_a$ in image a corresponds to point $p_b$ in image b is on the epipolar line of $p_b$ and vice versa. 3D reconstruction depends on this relationship.

Epipolar lines come in corresponding pairs. Another way to restate this is that the two projection rays and the baseline are coplanar for corresponding points. Given corresponding points $p_a$, $p_b$, the epipolar constraint is written algebraically by creating a 3×3 essential matrix E that combines rotation and translation to separate structure ($^aP$) from motion ($^aR_b$, $^at_b$) and makes motion estimation a linear problem in E. The computations find E by solving a homogeneous linear system, finding rotation and translation from E, and finding structure given rotation and translation.

The image points are represented as world points with the following matrices:

$$^a p_a = \begin{bmatrix} ^a x_a \\ ^a y_a \\ f \end{bmatrix} \text{ and } ^b p_b = \begin{bmatrix} ^b x_b \\ ^b y_b \\ f \end{bmatrix} \qquad \text{(Eq. 1)}$$

Each camera measures a point in its own reference system. The transformation is represented as:

$$^b p = {}^a R_b (^a p - {}^a t_b) \qquad \text{(Eq. 2)}$$

where the inverse of the transformation in Eq. 2 is:

$$^a p = {}^b R_a({}^b p - {}^b t_a) \text{ where } {}^b R_a = {}^a R_b \text{ and } {}^b t_a = -{}^a R_b {}^a t_b \quad \text{(Eq. 3)}$$

Figure 10B:
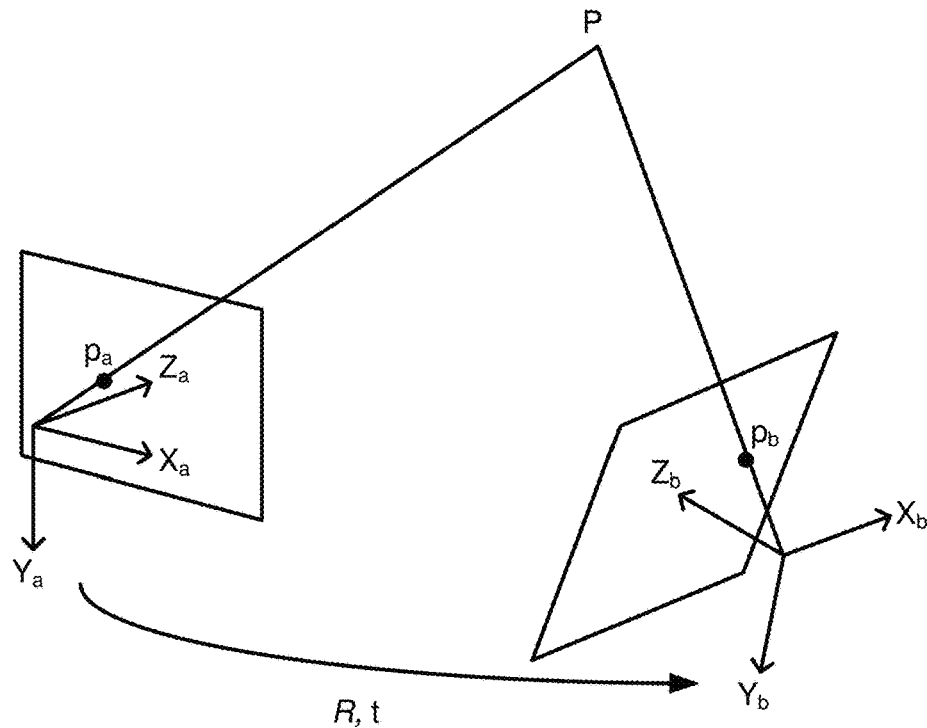
FIG. 10B illustrates how two images captured by cameras relate to an object according to some embodiments described herein.

FIG. 10B illustrates an example 1050 of how two images captured by cameras relate to an object according to some embodiments described herein. To simplify the above equations, $^a P_a$ is represented by a, $^b P_b$ is represented by b, $^a R_b$ is represented by R, $^a t_b$ is represented by t, and epipole $^a e_b$ is represented by e.

The epipolar constraint is represented by the following equation:

$$^a b = R^T b + t \quad \text{(Eq. 4)}$$

The equation assumes that the two projection rays and the baseline are coplanar. The epipolar constraint holds for any corresponding a, b in the two images (as world vectors in their reference systems).

E represents the essential matrix, which is defined by the following equation:

$$E = R[t]_x \quad \text{(Eq. 5)}$$

$$\text{where } t = (t_x, t_y, t_z)^T \text{ and } [t]_x = \begin{bmatrix} 0 & -t_z & t_y \\ t_z & 0 & -t_x \\ -t_y & t_x & 0 \end{bmatrix}.$$

Once the 3D modeling module 204 uses the above equations to determine a difference between the location of points in a pose between two different images, the 3D modeling module 204 calculates a synchronization error. In some embodiments, the synchronization error is a percentage difference between the two images.

In some embodiments, the 3D modeling module 204 determines whether the synchronization error exceeds a threshold error. If the synchronization error exceeds the threshold error, the 3D modeling module 204 may take a remedial step, such as instructing the user interface module 206 to generate graphical data that displays a user interface with instructions for changing a position of the second camera 120*b* based on the synchronization error. In examples where the second camera 120*b* is able to automatically adjust itself, such as if the second camera 120*b* includes a servo and mount, the 3D modeling module 204 may transmit an instruction to the second camera 120*b* to automatically change a position of the second camera 120*b* to reduce the synchronization error.

Once the position of each camera 120 in the set of cameras 120 is acceptable, the 3D modeling module 204 may generate discrete 3D levels of the object by generating a rough 3D mesh in levels or 3D pointclouds for each level of the object. In some embodiments, the 3D modeling module 204 employs third-party software to calculate the rough 3D mesh or the 3D pointclouds, such as Metashape, RealityCapture, or COLMAP.

In some embodiments, the 3D modeling module 204 receives a subset of images that correspond to a level and the position and orientation of each corresponding camera 120. For example, the landscape cylinder in FIG. 6 has six different levels. The 3D modeling module 204 performs feature extraction on the subset of the images. For example, the subset of images may be of a person and the 3D modeling module 204 identifies keypoints that include a location of the person's nose, distance to the person's eyes, location of the person's mouth, etc. The 3D modeling module 204 may use the same techniques described above for determining keypoints and poses or different techniques. For example, the 3D modeling module 204 may use a SIFT algorithm to determine the overlap between images and a SURF algorithm to perform feature extraction.

In some embodiments, the 3D modeling module 204 matches images from a subset of the images based on the images capturing the same areas of the object. In some embodiments, the 3D modeling module 204 provides the keypoints to a vocabulary tree, which outputs feature descriptors as leaves of the vocabulary tree.

The 3D modeling module 204 matches extracted features between the matched images. For example, the 3D modeling module 204 identifies the overlap of keypoints between two images and repeats the matching until the subset of images that correspond to a level are matched.

In some embodiments, the 3D modeling module 204 performs photometric matches between a set of the feature descriptors from two input images. From each feature in the first image, the 3D modeling module 204 obtains a list of candidate features in the second image and selects the two closest descriptors. The 3D modeling module 204 may use algorithms such as approximate nearest neighbor or cascading hashing to perform the matching. The 3D modeling module 204 may use the positions of the matching extracted features to make a geometric filtering using epipolar geometry in an outlier detection framework, such as RANdom Sample Consensus (RANSAC). The 3D modeling module 204 may select a small set of feature correspondences and computes a fundamental matrix, checks the number of features that validates the model, and iterates through the RANSAC framework. The 3D modeling module may perform the photometric matches for all of the input images until they have all been accounted for.

The 3D modeling module 204 generates a 3D pointcloud for each level based on the position and orientation of corresponding cameras 120 and matched extracted features. In some embodiments, the 3D modeling module 204 generates the 3D pointcloud for each level by fusing the feature matches between image pairs into tracks where each track represents a point in space that is visible from multiple cameras 120. The 3D modeling module 204 removes incoherent tracks during the fusion. In some embodiments, the 3D modeling module 204 selects an initial image pair that maximizes a number of matches and the repartition of corresponding features in each image.

In some embodiments, the 3D modeling module 204 next computes a matrix between the selected image pair and uses the matrix along with pose information to triangulate corresponding two-dimensional features in the images into 3D points for the 3D pointcloud. Next, the 3D modeling module 204 selects additional images that have overlap with the extracted features that are part of the existing 3D pointcloud and stitches the additional images to the 3D pointcloud. For example, the 3D modeling module 204 uses a Perspective-n-Point algorithm (PnP) in a RANSAC framework to find a pose from the images that maximizes a validation of the extracted features. The process continues, along with removal of invalid 3D points, until there are no more selected image pairs available.

The 3D modeling module 204 receives a 3D pointcloud for each level and merges the 3D pointclouds to form a three-dimensional volumetric model of the object. In some embodiments, the 3D modeling module 204 merges the 3D pointclouds by identifying overlap between the 3D pointclouds for each level and stitches the 3D pointclouds together based on the overlap. Because each level of the 3D pointcloud is generated independently, the method advantageously reduces the rolling shutter errors.

Figure 11:
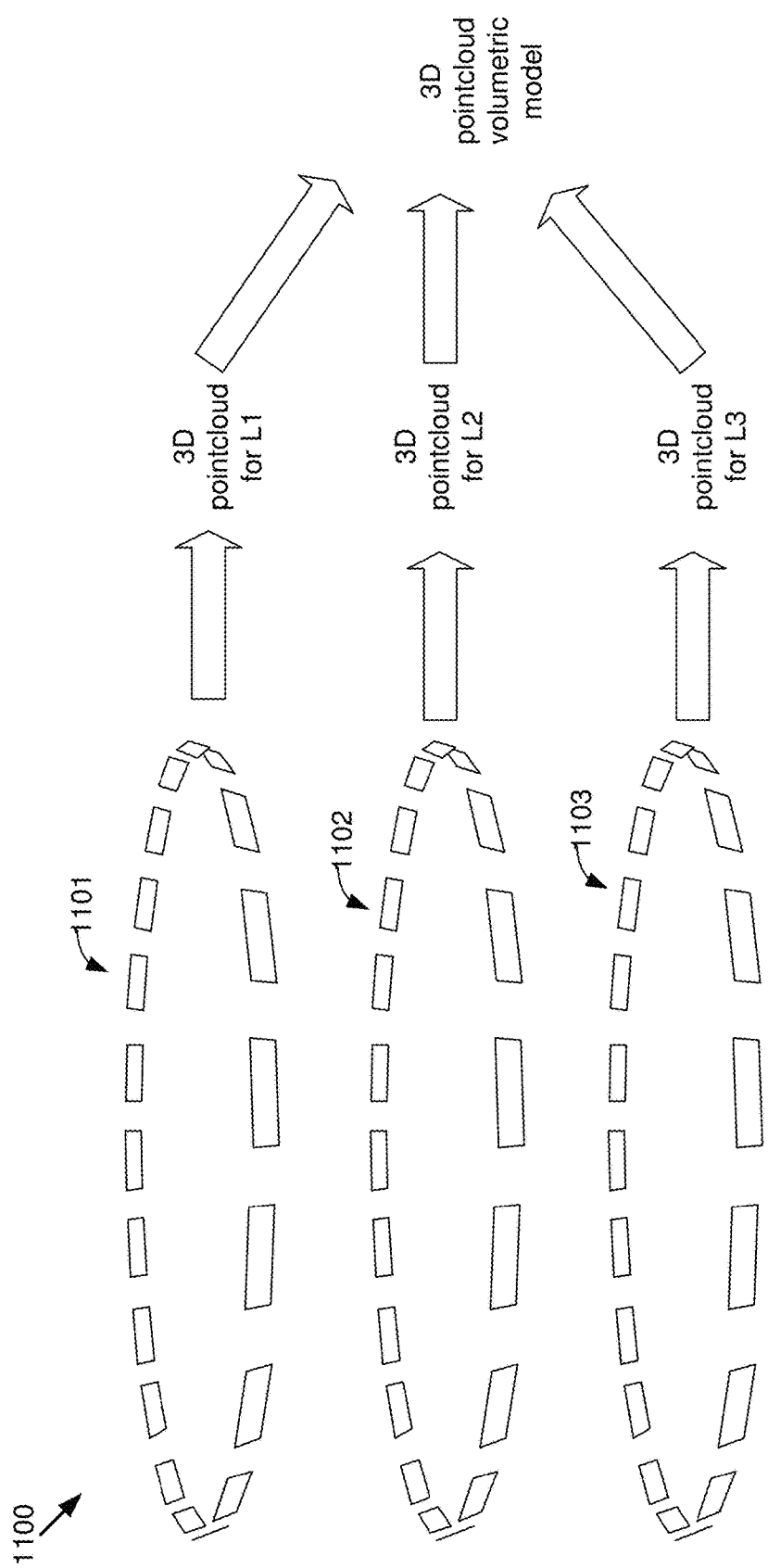
FIG. 11 is a block diagram that illustrates multiple levels of a set of cameras in landscape orientation that capture images that are used to form a three-dimensional (3D) volumetric model of an object according to some embodiments described herein.

The multiple levels of the 3D pointclouds may be horizontal levels or vertical levels. Turning to FIG. 11, a block diagram 1100 illustrates three levels of a set of cameras in landscape orientation that capture images that are used to form a three-dimensional (3D) volumetric model of an object. Specifically, the L1 1101, the L2 1102, and the L3 1103 levels of the set of cameras form a cylinder around an object and provide images that are used by the 3D modeling module 204 to generate a 3D pointcloud for L1, a 3D pointcloud for L2, and a 3D pointcloud for L3. The 3D modeling module 204 merges the three levels of pointclouds to generate a 3D pointcloud volumetric model.

Figure 12:
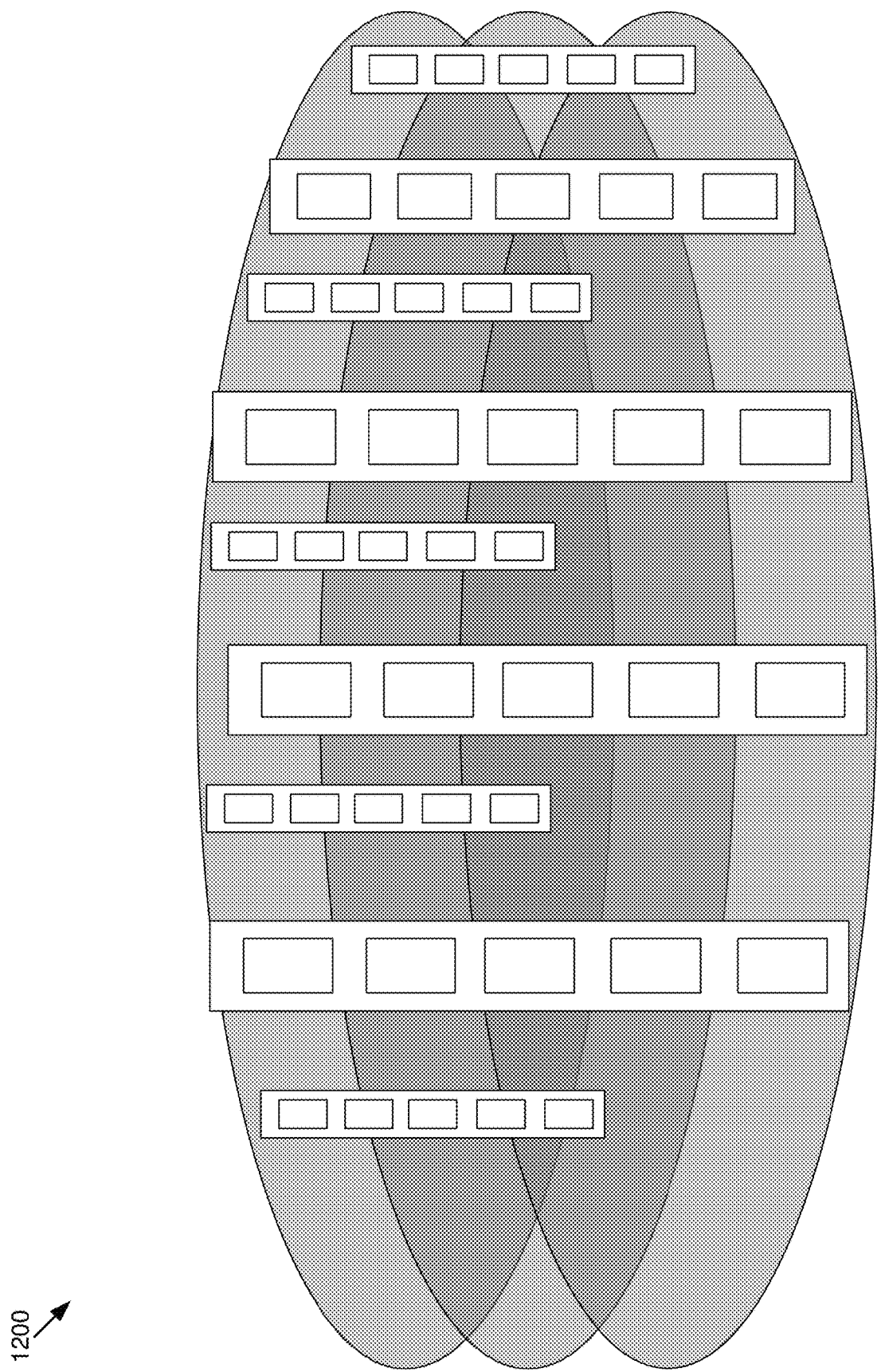
FIG. 12 is a block diagram that illustrates multiple levels of a set of cameras in portrait orientation that capture images that are used to form a 3D volumetric model of an object according to some embodiments described herein.

FIG. 12 is a block diagram 1200 that illustrates multiple levels of a set of cameras in portrait orientation that capture images that are used to form a 3D volumetric model of an object. The levels of the set of cameras 120 form columns around the object. In this example, there are many more levels of cameras when the cameras are in the portrait orientation than when the cameras 120 are in the landscape orientation. Similar to how the 3D pointcloud volumetric model is generated from images in landscape mode, the 3D modeling module 204 generates a 3D pointcloud for each level independently and then merges the 3D pointclouds to form the 3D pointcloud volumetric model.

The user interface module 206 generates a user interface. In some embodiments, the user interface module 206 includes a set of instructions executable by the processor 235 to generate the user interface. In some embodiments, the user interface module 206 is stored in the memory 237 of the computing device 200 and can be accessible and executable by the processor 235.

In some embodiments, the user interface module 206 receives instructions from the camera module 202 to display a user interface that provides instructions for how to position a camera 120a from the set of cameras 120. In some embodiments, the instructions are based on achieving a particular position and a particular orientation of the camera 120a. For example, the user interface may include a graphic that indicates a direction that includes any combination of moving up, moving down, moving left, moving right, tilting, rotating, etc.

Figure 13:
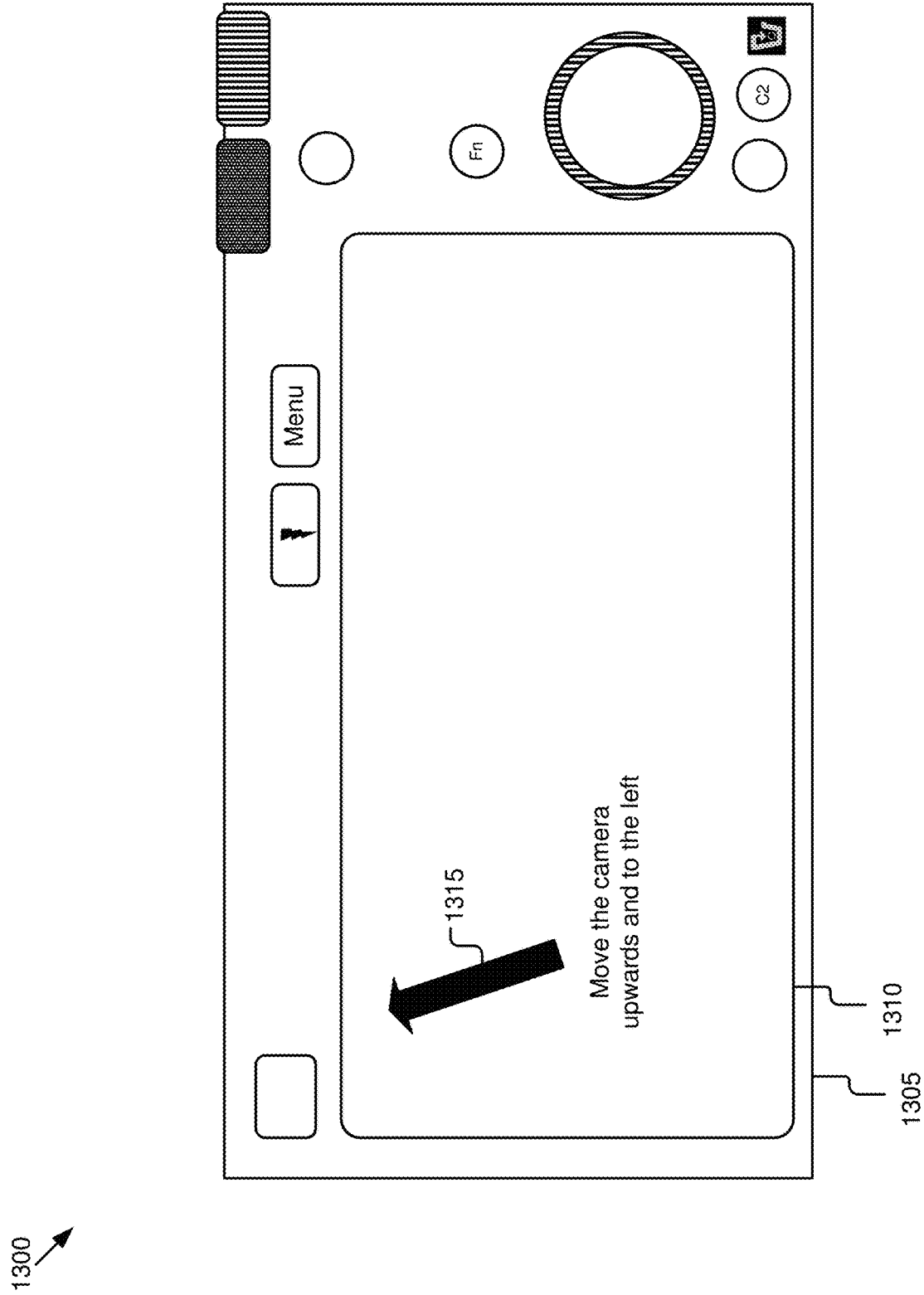
FIG. 13 is a block diagram that illustrates an example user interface that guides a user to change a position of a camera according to some embodiments described herein.

For example, FIG. 13 is a block diagram 1300 that illustrates a camera 1305 with a user interface 1310 that guides a user to change a position of the camera 1305. In this example, the user interface 1310 includes an arrow that indicates the direction for moving the camera 1305 up and to the left. In some embodiments, the length of the arrow 1315 indicates how much to move the camera 1305. As a user moves the camera 1305, the user interface 1310 updates to display a shorter arrow 1315 until the camera 1305 is at the desired location. In some embodiments, once the camera 1305 is at the desired location (e.g., once the synchronization error falls below a predetermined threshold), the user interface 1310 updates to display a confirmation that the camera 1305 is at the desired location, such as by displaying a checkmark or text.

Although the user interface in FIG. 13 is illustrated as being on a camera 120, other examples of user interfaces are possible. For example, the user device 115 may display a user interface with instructions on how to move one or more of the cameras 120a in the set of cameras 120. Specifically, the user interface may include an image of each of the cameras with a instructions for rotating one camera clockwise, tilting another camera, moving yet another camera a few inches to the left, etc.

Figure 14:
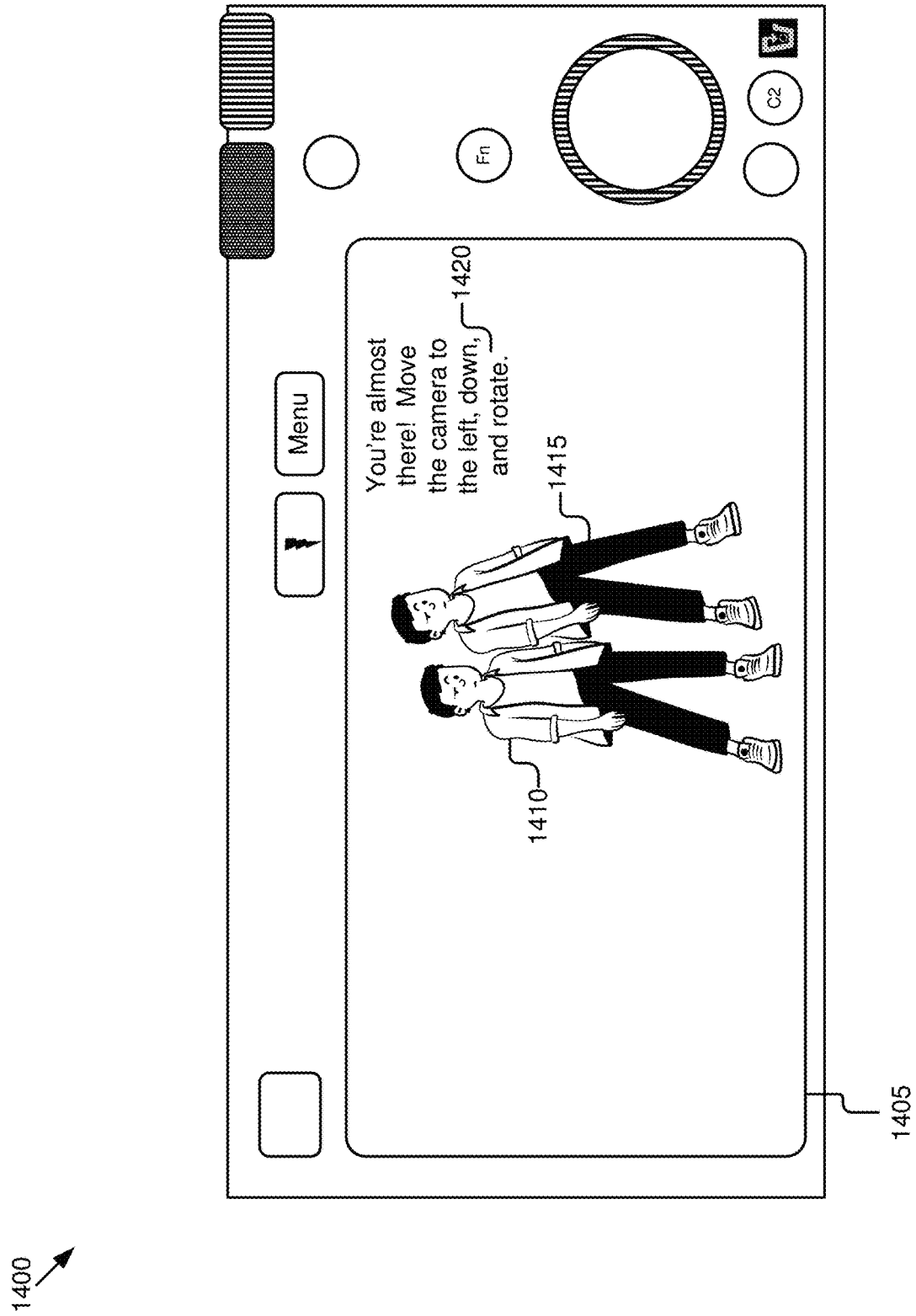
FIG. 14 is a block diagram that illustrates another example user interface that guides a user to change a position of a camera according to some embodiments described herein.

FIG. 14 is a block diagram 1400 that illustrates another example user interface 1405 that guides a user to change a position of a camera according to some embodiments described herein. In this example, the user interface 1405 includes a model of an ideal position 1410 of the object, a current position 1415 of the object, and text 1420 that includes instructions for how to move the camera to achieve the ideal position of the camera. As a user moves the camera, the current position 1415 of the object is updated to be closer or farther away to the model depending on how the camera is moved. The user may move the camera until the current position 1415 of the object is overlaid on the model of the idea position 1410 of the object.

Example Methods

Figure 15:
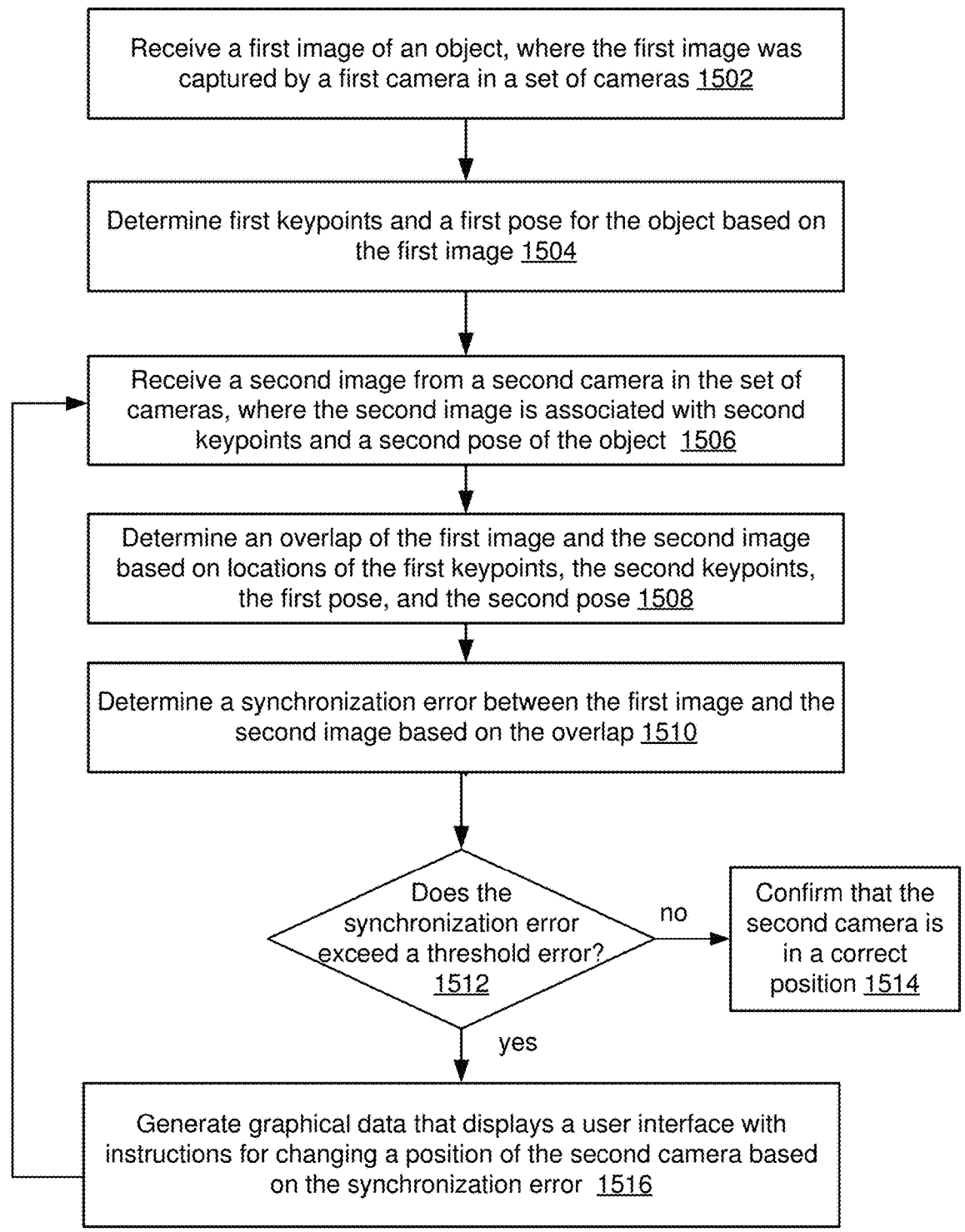
FIG. 15 illustrates a flowchart for generating graphical data that displays a user interface with instructions for changing a position of a camera according to some embodiments described herein.

FIG. 15 illustrates a flowchart of an example method 1500 for generating graphical data that displays a user interface with instructions for changing a position of a camera according to some embodiments described herein. The method 1500 may be performed by the computing device 200 in FIG. 2. For example, the computing device 200 may be the camera 120, the server 101, or the user device 115 illustrated in FIG. 1. The computing device 200 includes a camera application 103 that implements the steps described below.

The method 1500 may start with block 1502. At block 1502, a first image of an object is received where the first image was captured by a first camera 120a in a set of cameras 120. Block 1502 may be followed by block 1504.

At block 1504, first keypoints and a first poser are determined for the object based on the first image. Block 1504 may be followed by block 1506.

At block 1506, a second image is received from a second camera 120b in the set of cameras 120, where the second image is associated with second keypoints and a second pose of the object. Block 1506 may be followed by block 1508.

At block 1508, an overlap of the first image and the second image is determined based on locations of the first keypoints, the second keypoints, the first pose, and the second pose. Block 1508 may be followed by block 1510.

At block 1510, a synchronization error is determined between the first image and the second image based on the overlap. Block 1510 may be followed by block 1512. At block 1512, it is determined whether the synchronization error exceeds a threshold error. If the synchronization error exceeds the threshold error, block 1510 may be followed by block 1514. At block 1514, it is confirmed that the second camera 120b is in a correct position. For example, the second camera 120b may display a checkmark to indicate the camera 120b is in a correct position.

If the synchronization error does not exceed the threshold error, block 1510 may be followed by block 1516. At block 1516, graphical data is generated that displayed a user interface with instructions for changing a position of the second camera 120b based on the synchronization error. Block 1516 may be followed by 1506 and the process may repeat until the synchronization error does not exceed the threshold error.

Figure 16:
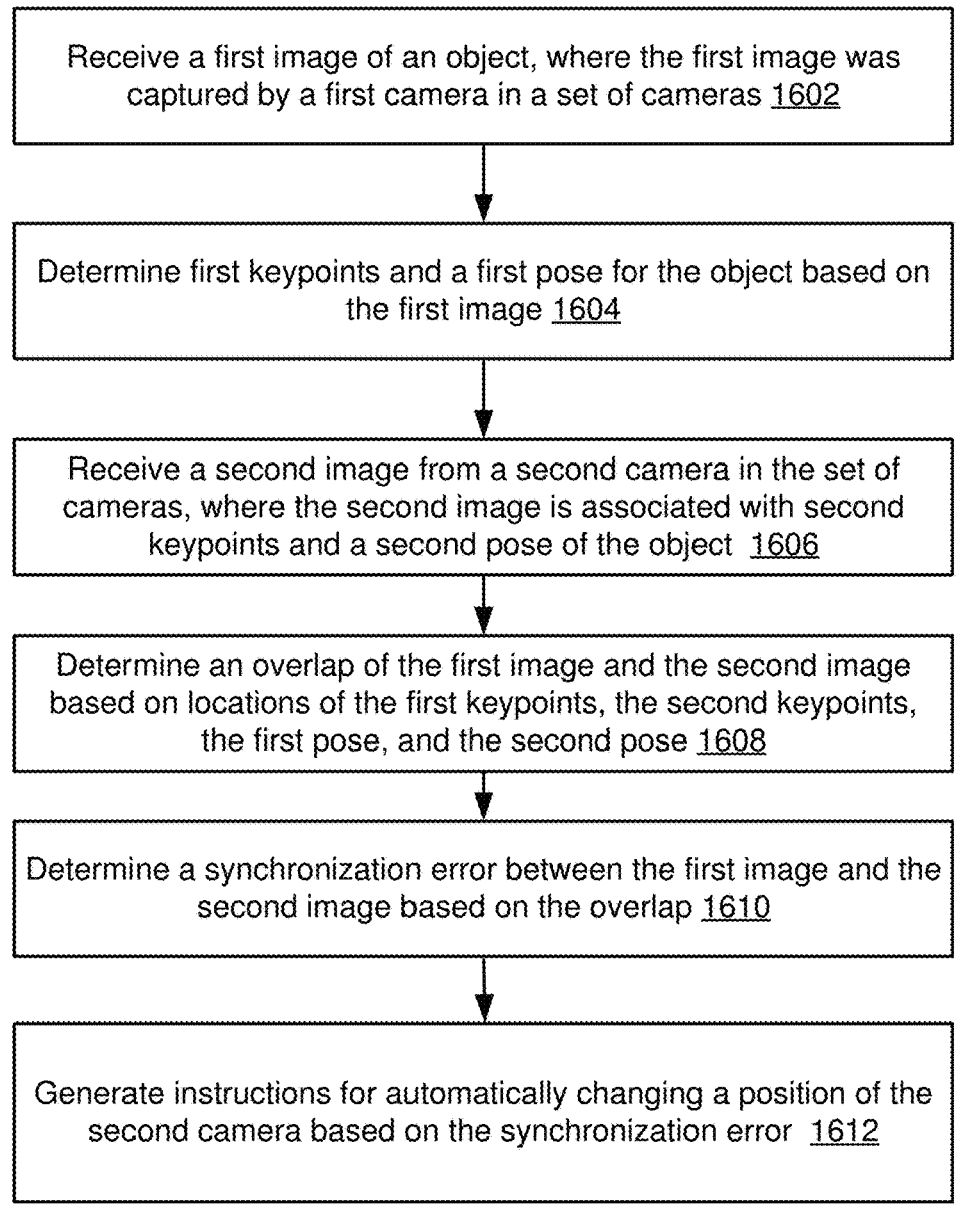
FIG. 16 illustrates a flowchart for transmitting an instruction to a camera to automatically change a position of the camera according to some embodiments described herein.

FIG. 16 illustrates a flowchart of an example method 1600 for transmitting an instruction to a camera to automatically change a position of the camera according to some embodiments described herein. The method 1600 may be performed by the computing device 200 in FIG. 2. For example, the computing device 200 may be the camera 120, the server 101, or the user device 115 illustrated in FIG. 1. The computing device 200 includes a camera application 103 that implements the steps described below.

The method 1600 may start with block 1602. At block 1602, a first image of an object is received where the first image was captured by a first camera 120a in a set of cameras 120. Block 1602 may be followed by block 1604.

At block 1604, first keypoints and a first poser are determined for the object based on the first image. Block 1504 may be followed by block 1606.

At block 1606, a second image is received from a second camera 120b in the set of cameras 120, where the second image is associated with second keypoints and a second pose of the object. Block 1606 may be followed by block 1608.

At block 1608, an overlap of the first image and the second image is determined based on locations of the first keypoints, the second keypoints, the first pose, and the second pose. Block 1608 may be followed by block 1610.

At block 1610, a synchronization error is determined between the first image and the second image based on the overlap. Block 1610 may be followed by block 1612.

At block 1612, instructions for automatically changing a position of the second camera 120b based on the synchronization error are generated. For example, the second camera 120b may include a servo and a mount that automatically adjust the position of the second camera 120b based on the instructions.

Figure 17:
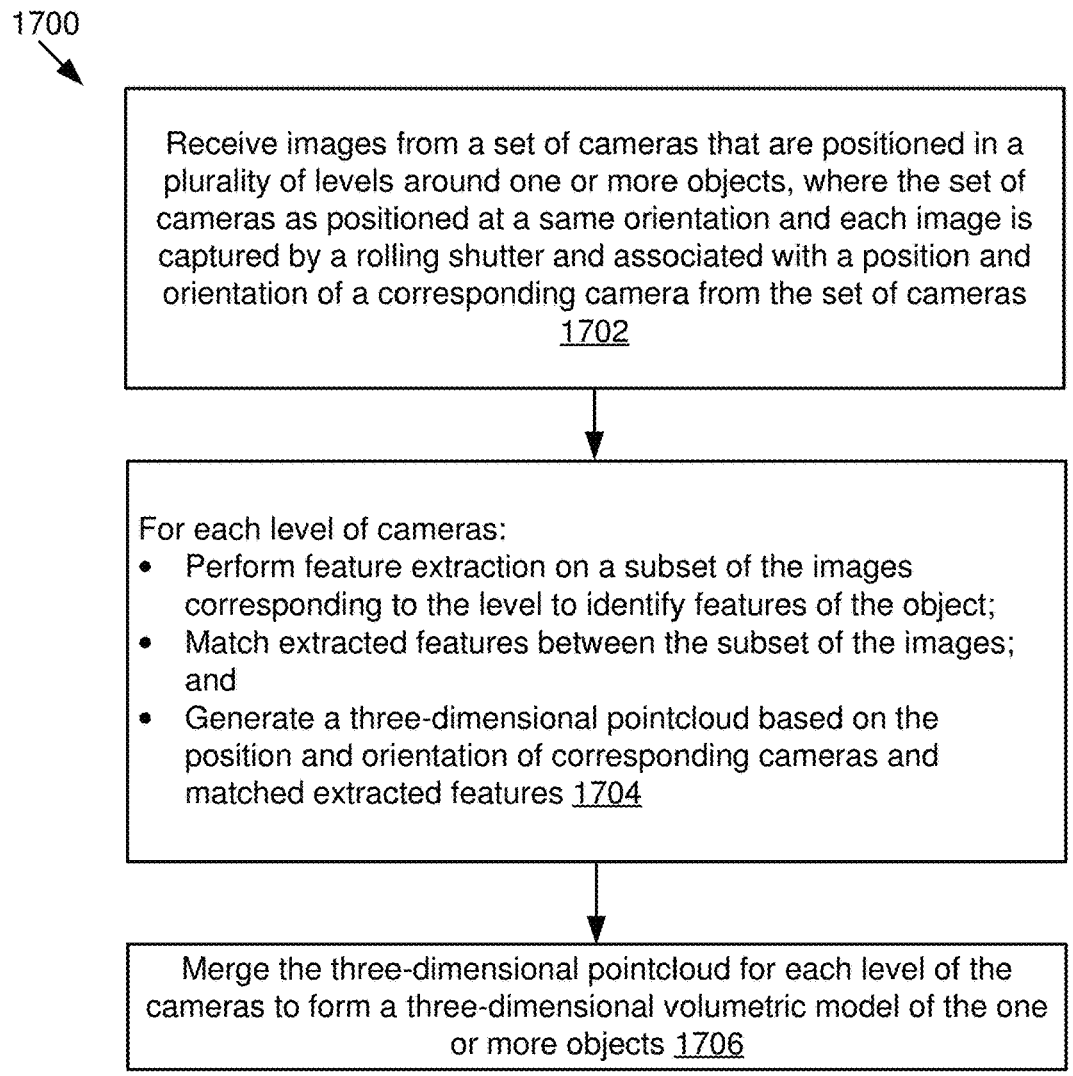
FIG. 17 illustrates a flowchart for generating a 3D volumetric model of an object according to some embodiments described herein.

FIG. 17 illustrates a flowchart of an example method 1700 for generating a 3D volumetric model of an object according to some embodiments described herein. The method 1700 may be performed by the computing device 200 in FIG. 2. For example, the computing device 200 may be the camera 120, the server 101, or the user device 115 illustrated in FIG. 1. The computing device 200 includes a camera application 103 that implements the steps described below.

The method 1700 may start with block 1702. At block 1702, images are received from a set of cameras 120 that are positioned in a plurality of levels around one or more objects, where the set of cameras 120 are positioned at a same orientation and each image is captured by a rolling shutter and associated with a position and orientation of a corresponding camera 120a from the set of cameras 120. Block 1702 may be followed by block 1704.

At block 1704, for each level of cameras 120: feature extraction is performed on a subset of the images corresponding to the level to identify features of the object; match extracted features between the subset of the images; and generate a 3D pointcloud based on the position and orientation of corresponding cameras and matched extracted features. Block 1204 may be followed by block 1206.

At block 1706, the three-dimensional pointclouds for each level of the cameras 120 are merged to form a three-dimensional volumetric model of the one or more objects.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:
receiving a first image of an object, wherein the first image was captured by a first camera in a set of cameras;
determining first keypoints and a first pose for the object based on the first image;
receiving a second image from a second camera in the set of cameras, wherein the second image is associated with second keypoints and a second pose of the object;

determining an overlap of the first image and the second image based on locations of the first keypoints, the second keypoints, the first pose, and the second pose;
determining a synchronization error between the first image and the second image based on the overlap; and
generating graphical data that displays a user interface with instructions for changing a position of the second camera based on the synchronization error.

2. The method of claim 1, further comprising:
performing object recognition of the object in the first image to identify a type of object in the first image, wherein determining the first keypoints and the first pose for the object is based on the type of object in the image.

3. The method of claim 1, further comprising:
determining whether the synchronization error exceeds a threshold error; and
responsive to the synchronization error exceeding the threshold error, transmitting the graphical data that displays the user interface to the second camera.

4. The method of claim 1, wherein the first camera is a master camera, and further comprising:
determining whether the synchronization error exceeds a threshold error; and
responsive to the synchronization error exceeding the threshold error, transmitting the graphical data that displays the user interface to the second camera.

5. The method of claim 1, wherein determining the first keypoints and the first pose for the object is based on a machine-learning model that is trained to identify a type of object, the first keypoints, and the first pose, based on supervised learning.

6. The method of claim 5, wherein a training data set that is used to train the machine-learning model includes labeled keypoints that identify different parts of a body for the type of object.

7. The method of claim 1, wherein the instructions for changing the position of the second camera includes a graphic that indicates a direction selected from the group consisting of moving up, moving down, moving left, moving right, tilting, rotating, and combinations thereof.

8. The method of claim 1, wherein generating the graphical data that displays the user interface with instructions for changing the position of the second camera includes a model of the object and an overlay of the object that represent a current position of the second camera, wherein moving the position of the second camera causes the overlay to be displayed closer or farther away to the model of the object.

9. The method of claim 1, wherein determining the synchronization error is based on using epipolar geometry to determine a difference between the first image and the second image and wherein the first keypoints and the second keypoints are facial keypoints.

10. An apparatus comprising:
one or more processors; and
logic encoded in one or more non-transitory media for execution by the one or more processors and when executed are operable to:
receive a first image of an object, wherein the first image was captured by a first camera in a set of cameras;
determine first keypoints and a first pose for the object based on the first image;
receive a second image from a second camera in the set of cameras, wherein the second image is associated with second keypoints and a second pose of the object;
determine an overlap of the first image and the second image based on locations of the first keypoints, the second keypoints, the first pose, and the second pose;
determine a synchronization error between the first image and the second image based on the overlap; and
generate instructions for automatically changing a position of the second camera based on the synchronization error.

11. The apparatus of claim 10, wherein the logic is further operable to:
perform object recognition of the object in the first image to identify a type of object in the first image, wherein determining the first keypoints and the first pose for the object is based on the type of object in the image.

12. The apparatus of claim 10, wherein the logic is further operable to:
determine whether the synchronization error exceeds a threshold error; and
responsive to the synchronization error exceeding the threshold error, transmit the instructions to the second camera.

13. The apparatus of claim 10, wherein determining the first keypoints and the first pose for the object is based on a machine-learning model that is trained to identify a type of object, the first keypoints, and the first pose, based on supervised learning.

14. The apparatus of claim 13, wherein a training data set that is used to train the machine-learning model includes labeled keypoints that identify different parts of a body for the type of object.

15. Software encoded in one or more non-transitory computer-readable media for execution by one or more processors and when executed is operable to:
receive a first image of an object, wherein the first image was captured by a first camera in a set of cameras;
determine first keypoints and a first pose for the object based on the first image;
receive a second image from a second camera in the set of cameras, wherein the second image is associated with second keypoints and a second pose of the object;
determine an overlap of the first image and the second image based on locations of the first keypoints, the second keypoints, the first pose, and the second pose;
determine a synchronization error between the first image and the second image based on the overlap; and
generate graphical data that displays a user interface with instructions for changing a position of the second camera based on the synchronization error.

16. The software of claim 15, wherein the one or more processors are further operable to:
perform object recognition of the object in the first image to identify a type of object in the first image, wherein determining the first keypoints and the first pose for the object is based on the type of object in the image.

17. The software of claim 15, wherein the one or more processors are further operable to:
determine whether the synchronization error exceeds a threshold error; and
responsive to the synchronization error exceeding the threshold error, transmit the graphical data that displays the user interface to the second camera from the set of cameras.

18. The software of claim 15, wherein determining the first keypoints and the first pose for the object is based on a machine-learning model that is trained to identify a type of object, the first keypoints, and the first pose, based on supervised learning.

19. The software of claim 15, wherein the instructions for changing the position of the second camera includes a graphic that indicates a direction selected from the group consisting of moving up, moving down, moving left, moving right, tilting, rotating, and combinations thereof.

20. The software of claim 15, wherein generating the graphical data that displays the user interface with instructions for changing the position of the second camera includes a model of the object and an overlay of the object that represent a current position of the second camera, wherein moving the position of the second camera causes the overlay to be displayed closer or farther away to the model of the object.

\* \* \* \* \*